US009998898B1

(12) United States Patent
Govindassamy

(10) Patent No.: US 9,998,898 B1
(45) Date of Patent: Jun. 12, 2018

(54) METHOD AND APPARATUS FOR COLLABORATIVE BROADCAST INFORMATION RECEPTION

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

(*) Notice: Subject to any disclaimer, the term of this patent is extended or adjusted under 35 U.S.C. 154(b) by 29 days.

(21) Appl. No.: 15/352,097

(22) Filed: Nov. 15, 2016

(51) Int. Cl.
| H04W 4/80 | (2018.01) |
| H04W 16/22 | (2009.01) |
| H04W 16/20 | (2009.01) |
| H04W 52/02 | (2009.01) |
| H04W 48/10 | (2009.01) |
| H04W 36/00 | (2009.01) |
| H04W 84/04 | (2009.01) |
| H04W 68/00 | (2009.01) |

(52) U.S. Cl.
CPC ............ *H04W 4/80* (2018.02); *H04W 16/20* (2013.01); *H04W 16/225* (2013.01); *H04W 36/0061* (2013.01); *H04W 36/0072* (2013.01); *H04W 48/10* (2013.01); *H04W 52/0219* (2013.01); *H04W 68/005* (2013.01); *H04W 84/042* (2013.01)

(58) Field of Classification Search
CPC ...... H04W 4/80; H04W 16/20; H04W 16/225
See application file for complete search history.

(56) References Cited

U.S. PATENT DOCUMENTS

2016/0227351 A1* 8/2016 Gu ...................... H04L 61/6022

OTHER PUBLICATIONS

U.S. Appl. No. 15/233,488, filed Aug. 10, 2016. Title: Method and Apparatus for Broadcast Information Transmission.

* cited by examiner

*Primary Examiner* — Ashley Shivers
(74) *Attorney, Agent, or Firm* — Lerner, David, Littenberg, Krumholz & Mentlik, LLP

(57) ABSTRACT

As the variety and number of wireless client devices have increased, often there may be multiple client devices in close proximity of each other. In addition to the connectivity to the wireless wide area network (WWAN), the client devices may have short range link to directly connect with each other. Two or more client devices in a given area may be camped on the same cell of the same WWAN, and the client devices may be decoding the same broadcast information. A method and apparatus are disclosed such that a client device may decode the broadcast information from the WWAN and relay the WWAN broadcast information to other client devices over the short range link. This may enable other client devices to avoid having to decode the broadcast information directly from the WWAN which may reduce their power consumption and at times it may help the client devices for faster WWAN connection setup.

26 Claims, 17 Drawing Sheets

METHOD AND APPARATUS FOR COLLABORATIVE BROADCAST INFORMATION RECEPTION

CROSS REFERENCE TO RELATED APPLICATIONS

This application is related to U.S. patent application Ser. No. 15/233,488 filed Aug. 10, 2016, and U.S. patent application Ser. No. 15/351,999, filed Nov. 15, 2016, the disclosures of which are hereby incorporated herein by reference.

BACKGROUND

A client device as defined in the present disclosure is a device that may access voice, video, text, instant messaging, internet and other services from a wireless communication network. Such client devices may include conventional devices such as a smartphone, a tablet, a feature-phone, a laptop or a desktop personal computer, etc. Other client devices may include devices that are embedded within devices that perform other functions such as an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, an industrial equipment, etc.

The wireless communication networks are often referred to as Wireless Wide Area Network (WWAN). The internet service offered by such networks is often referred to as mobile broadband internet or Mobile Broadband (MB) and the WWANs are often referred to as mobile broadband networks. The terms WWAN and MB are used interchangeably herein. An example of a mobile broadband network is the Long Term Evolution (LTE) from the $3^{rd}$ Generation Partnership Project (3GPP). The LTE technology and its evolution are often referred to as fourth generation (4G) technologies. A client device may also use any of the previous generation technologies such as "2G", "3G" from 3GPP and other standardization bodies. A client device may also use future generation technologies for mobile networks. Typically, as shown in FIG. 1, a WWAN comprises elements such as client devices or mobile stations and one or more base stations. Other network devices may also be employed, such as a mobile switching center (not shown). As illustrated in FIG. 1, the communication path from the base station (BS) to the client device or mobile station (MS) is referred to herein as a downlink (DL) direction or downlink channel. The communication path from the client device to the base station is referred to herein as an uplink (UL) direction or uplink channel. In some wireless communication systems, the MS communicates with the BS in both the DL and UL directions. For instance, such communication is carried out in cellular telephone systems. In other wireless communication systems, the client device communicates with the base stations in only one direction, usually the DL. Such DL communication may occur in applications such as paging. Typically in a wireless communication system, the client device and the base station may transmit information in blocks of data and such a block of data is referred herein as a "message."

A base station to which the client device may be downlink synchronized and/or communicating with at any given time is referred to herein as the Serving Base Station (SBS). In some wireless communication systems the serving base station may be referred to as the serving cell. The base stations that are in the vicinity of the serving base station are called Neighbor Base Stations (NBS). Similarly, in some wireless communication systems a neighbor base station may be referred to as a neighbor cell.

A client device, after initially synchronizing with a cell, may switch to another cell depending on the signal conditions, network congestion, and other criteria. The process of switching from one cell to another cell by a client device is often referred to as handover (HO) or cell reselection. In some wireless communication systems handover is also referred to as handoff. Also in some wireless communication systems cell reselection is also referred to as idle mode handoff. An NBS, to which a client device may be switching over its communication from the current SBS, is herein referred to as Target Base Station (TBS). In some wireless communication systems, a target base station is normally referred to as a target cell. Sometimes, during a handover, the serving cell and the target cell may be the same and only the channel used for communication may be changed. Such a handover, in which the cell is not changed, is called as an intra-cell handover. The purpose of intra-cell handover may be that the new channel is better suited for communication than the previous channel within the same cell. Cell reselections or handovers amongst cells that use the same frequency are referred herein as intra-frequency cell reselection or handover. Cell reselections or handovers amongst cells that use different frequencies are referred herein as intra-frequency cell reselection or handover. A network may use different Radio Access Technologies (RATs) for providing various services. In a particular network, the cells of different RAT types may be overlapping or adjacent to each other. If a neighbor cell is using a RAT type that is different from the RAT type used by the serving cell, it is referred to as an inter-RAT neighbor cell.

The decision making process for handovers and cell reselections varies from one wireless communication system to another. However, the decisions are generally based on the signal conditions measurements by the client devices and reporting of those measurements to the wireless communication network by the client devices. The wireless communication network generally may influence and control the measurements and reporting process of the client device by providing parameters for the measurement and reporting process. The actual decision to perform handover may be made either by the wireless communication network or by the client device depending on the type of particular wireless communication system. On the other hand the cell reselection decisions in idle mode (i.e., when client device is not in active communication with the wireless communication network) may be generally performed autonomously by the client device. Both handovers and cell reselections may normally lead to change of cell from which the client device may access communication services. The difference between the handover procedure and cell reselection procedure depends generally on whether a client device is engaged in an active communication with the wireless communication network.

Normally, certain types of system information may be required by all client devices so that they may communicate with the wireless communication network. The system information typically includes system synchronization information, system parameters, resource allocation information, paging information, etc. The wireless communication network may transmit such system information as broadcast data so that all client devices within its coverage area may be able to receive. Such information is herein referred to as "broadcast messages."

Typically in a wireless communication system a base station may group the system information and each group of system information may be transmitted as multiple broadcast messages and such broadcast messages are herein referred as system parameter messages. The system parameter messages may carry important system information without which the client device may not be able to communicate with the wireless communication network. The wireless communication network may transmit these system parameter messages at regular intervals in such a way that any client device that enters its coverage area may receive these system parameter messages and may be able to communicate with the wireless communication network at the earliest possible time. Client devices that are already in the base station's coverage area may also periodically receive these system parameter messages for possible updates. Normally a client device may store the system parameter messages in its memory for the current SBS.

Typically, in wireless communication systems, most of the system parameter messages may not change frequently. For example, some system parameter messages may change once or twice a day and some system parameter messages may not change for many days.

In some wireless communication systems, when a client device switches to a new base station due to cell reselection or handover, it may be required to receive the system parameter messages for the new SBS and certain system parameter messages for the selective list of NBSs corresponding to the new SBS.

The set of all system parameter messages broadcast by a base station is herein referred to as "base station broadcast system information." The individual block of system information message may be referred to as System Information Block (SIB). Two or more SIBs may be grouped and sent as a single System Information (SI) message. There may be different SIBs describing different groups of system parameters such as SIB Type1 (SIB1), SIB Type2 (SIB2), etc. The SI for one or more cells may be periodically updated by the network. To ensure that the client devices are using the correct version of the SI, a field referred herein as "change-mark" is generally included in the SI messages. Client devices may store the change-mark of the SIs it has decoded. If the new SI is transmitted by a cell, it may increment the change-mark to enable the client terminal to detect that it needs to acquire the newly updated SI. The change-mark of the newly acquired SI is then used as a latest version for detecting any future changes in the SI. The change-mark field may be incremented in modulo arithmetic to keep the field bit-width to a minimum. For example, the change-mark may be incremented modulo-8 and the value may be represented by a 3-bit wide field.

In idle mode, a client device for the most part may turn off a majority of its circuitry to reduce power consumption. This is often referred to as "sleep" state, a sub-state within the idle mode. A client device may remain in a sleep state for a long duration and may wake up at the desired time window when it expects to receive the paging messages and certain SIBs. This alternating sequence of sleep and wake-up in idle mode is referred herein as Discontinuous Reception (DRX). The sleep and wake-up sequence may follow a regular pattern and its period is often referred to as DRX cycle. The success rate for the incoming calls (e.g., mobile terminated voice calls and/or data calls) in a client device is directly related to the successful reception of paging messages. Normally, in idle mode, in addition to the reception of paging messages and SIB messages, a client device may continue to search and monitor neighbor cells.

When a client device performs a network registration procedure to get service from a cell, it decodes the system information broadcast in the cell. The client device may store such system information. The system information carries important information regarding the cell reselection criteria. Such information includes but is not limited to the tracking area identity (TAI), Public Land Mobile Network Identity (PLMN ID) which uniquely identifies a particular network operator, Closed Subscriber Group Identity (CSG ID), RAT type, neighbor cell frequencies, etc. This information may help to decide whether a cell is a "suitable cell" for the client device to avail all the services offered by it, or the cell is an "acceptable cell" where the client device may avail only limited services such as emergency calls. The client device may have to perform the network registration procedure to get service from the network and for the network to be able to page the client device for mobile terminated (incoming) calls. The network registration procedure may be typically performed by a client device with a particular cell. A group of cells in the geographic vicinity of each other may form a registration area. A registration area may be identified based on the system information of a cell. For example, the TACs of a group of cells in a registration area may be the same.

Each base station in a wireless communication network may be identified by a unique identifier referred to herein as Cell Identity (CID). The CID of a base station may become known to a client device when it decodes SI from the base station. To avoid unnecessary updates from a client device and yet ensure the ability to reach a client device at any given time, the network may organize a group of cells into a "tracking area" and use a Tracking Area Identity (TAI) to identify the various groups of cells. This is illustrated in FIG. 2 where four different tracking areas are illustrated. A cell may broadcast information about the tracking area it belongs to by including the TAI information in the system information. A client device may be required to inform the network when it begins to receive service from a cell that belongs to a tracking area that is different from the tracking area of the cells from which it was previously receiving service. The process of informing the network that the client device has begun receiving service from a cell that belongs to a new tracking area is referred herein as Tracking Area Update (TAU) procedure. With this method, a client device performs TAU only when there is a change in TAI of the cell from which it is getting service. For example, in FIG. 2, when a client device reselects from the cell with CID=1003 to the cell with CID=1007 which has the same TAI, it may not perform TAU procedure. However, when the client device reselects from the cell with CID=1007 and TAI=200 to the cell with CID=1012 and TAI=201, it may perform TAU procedure.

Different client devices may be identified using their respective unique identities. For example, International Mobile Subscriber Identity (IMSI), Temporary Mobile Subscriber Identity (TMSI), the Media Access Control (MAC) address, the Internet Protocol (IP) address may be used for the identity. Regardless of any particular identity used, it is generically referred to herein as Client Device Identity (CDI).

As long as a client device is in the same registration area, the client device may not perform a network registration procedure again except that a periodic network registration update procedure may need to be performed even if the client device continues to move within the same registration area. If the client device moves to a cell which does not belong to the registration area in which the client device is registered, then the client device may perform a network registration procedure to get access to and service from the network.

When a client device is in idle mode, the network may only be aware of the location of the client device at the registration area level. In order for a network to page a client device, it may need to send the paging message in all cells belonging to the same registration area. The instances for paging message transmission, known as paging occasions (POs), are usually derived based on a client device's unique identity and the paging cycle. The network may transmit a paging message addressed to a specific client device in its specific paging occasion. When a client device performs cell reselection, the exact instances of paging occasions may be different in the new serving cell. Depending on the exact timing of the cell reselection and the timing of the POs in the old serving cell and the new serving cell, the client device may potentially miss a paging message or may receive it with delay.

As the variety and number of client devices have increased, often there may be multiple client devices in close proximity of each other. For example, a number of smartphones, tablets, entertainment systems, gaming consoles, navigation systems, etc. with connectivity to the wireless communication network may be present in a home, an office, a car, etc. There may be a need for the client devices to communicate with other client devices that may be in their close proximity. Therefore, in addition to the connectivity to the wireless communication network, the client devices may have other short range wireless connectivity interfaces to directly connect with each other without relying on a WWAN. Examples of such Short Range Wireless Links (SRWL) may include Wireless Local Area Network (WLAN) commonly known as Wi-Fi, Bluetooth™, or some other local area wireless networking schemes. The SRWLs may operate in a one-to-one or one-to-many mode of communication. For example, the WLAN may operate in an infrastructure mode in which the client devices communicate through an Access Point (AP) that may serve as a bridge to other client devices and other network elements such as internet. The WLAN may also operate in an ad hoc mode in which the two client devices may communicate directly with each other in a peer-to-peer manner. In general the SRWL may use any one of the well known networking topologies such as point-to-point, bus, star, ring or circular, mesh, tree, hybrid, or daisy chain. An example of this scenario is illustrated in FIG. 3 which includes the WWAN 302 and the SRWL 304 between the client devices Smartphone 308 and Smartphone 310. The SRWL 304 has the coverage area 306. The two client devices Smartphone 308 and Smartphone 310 are connected to the WWAN and directly with each other over the SRWL. The client device Smartphone 312 is connected to the WWAN but it is outside the coverage area of the SRWL.

Two or more client devices in a given area may be camped on the same cell of the same WWAN, and the client devices may be decoding the same broadcast information (SIBs). This may be a redundant reception since the client devices may be camped on the same cell of the same WWAN.

SUMMARY

A method and apparatus are disclosed such that a single client device may decode the broadcast information from the WWAN and relay the WWAN broadcast information to the client devices over the SRWL. This may enable other client devices to avoid having to decode the broadcast information directly from the WWAN. As power consumption of client devices may be critical, the relaying of the system information over SRWL from one client device to other client devices may be a more power efficient method for other client devices.

In accordance with an aspect of the present disclosure, a method may provide for collaborative communication of broadcast information in a communication network in which a Short Range Wireless Links (SRWL) is established between a first client device and a plurality of second client devices. The method may include controlling, by a processing device, at the first client device, receiving over the SRWL a broadcast Primary Client Device (PCD) Request message transmitted from each of a third client device and fourth client device of the second client devices; transmitting over the SRWL a PCD Accept message to each of the third and fourth client devices; and receiving over the SRWL broadcast information of a Wireless Wide Area Network (WWAN) through the third client device and the fourth client device.

In one alternative, the method may include controlling, by a processing device, at the first client device as a secondary client device (SCD) of the third and fourth client devices, receiving over the SRWL a first subset of system information blocks (SIBs) from the third client device as a first PCD of the first client device and a second subset of SIBs from the fourth client device as a second PCD of the first client device.

In one alternative, the method may include controlling, by the processing device, at the first client device, when the first client device is moved away from one of the third client device and the fourth client device respectively, continuing to receive over the SRWL a remaining broadcast information of the WWAN from the other of the third client device and the fourth client device.

In one alternative, the method may include controlling, by the processing device, at the first client device as a secondary client device (SCD) of the third and fourth client devices each of which is a PCD of the first client device, when the first client device receives over the SRWL a PCD Revoke broadcast message from one of the third client device and the fourth client device, determining whether at least one PCD for the first client device is remaining on the SRWL, when a determination is at least one PCD is remaining, continuing to receive over the SRWL the broadcast information form the WWAN from the at least one PCD remaining on the SRWL, when a determination is not one PCD is remaining on the SRWL, receiving over the SRWL a PCD Request message from a fifth client device of the second client devices, in which the PCT Request message from the fifth client device is based on a determination at the fifth client device which was previously a SCD for the first client device on the SRWL to become a PCD for the first client device on the SRWL and in which the fifth client device resumes receiving broadcast information directly from the WWAN.

In accordance with an aspect of the present disclosure, a method may provide for collaborative communication of broadcast information in a communication network in which a Short Range Wireless Links (SRWL) is established between a first client device and a plurality of second client devices, where the method may include controlling, by a processing device, at the first client device, receiving broadcast Primary Client Device (PCD) Request messages transmitted over the SRWL respectively from a plurality of third client devices of the second client devices and including received signal metrics; comparing the received signal metrics from the plurality of third client devices and selecting as a preferred PCD a selected client device of the third client devices determined to have a best received signal metric, such that the first client device is a secondary client device (SCD) of the selected client device; and transmitting over the SRWL a PCD Accept message to the selected client device.

In one alternative, the received signal metric may include at least one of a Received Signal Strength Indicator (RSSI), Reference Signal Received Power (RSRP), Reference Signal Received Quality (RSRP) or Signal to Interference Noise Ratio (SINR).

In one alternative, the method may include controlling, by a processing device, at the first client device, determining, as the selected client device, a fourth client device of the third client devices which is camped on to a same cell on which the first client device is camped, or a fifth client device of the third client devices which is not camped on to the same cell on which the first client device is camped and includes a cell ID of ae cell on which the first client device is camped in a neighbors cell list included with the PCD Request message from the fifth client device.

In one alternative, the method may include controlling, by the processing device, at the first client device, when at least one of the third client devices is established as at least one PCD for the first client device, communication and exchanging of WWAN capabilities with the at least one PCD over the SRWL.

In one alternative, the exchanging of WWAN capabilities with the at least one PCD may include, for a cell on which each of the first client device and the least one PCD is camped, at least one of a current WWAN identity, a Radio Access Technology (RAT) type, a cell identification (CID), target area information (TAI), frequency of channel, or default Discontinuous Reception (DRX) cycle or paging cycle.

In accordance with an aspect of the present disclosure, a method may provide for collaborative communication of broadcast information in a communication network in which a Short Range Wireless Links (SRWL) is established between a first client device and at least one second client device, where the method may include controlling, by a processing device, at the first client device, receiving over the SRWL a broadcast Primary Client Device (PCD) Request message, wherein the PCD Request message is transmitted from at least one third client device of the at least one second client device; transmitting over the SRWL a PCD Accept message to the at least one third client device; and receiving over the SRWL broadcast information of a Wireless Wide Area Network (WWAN) through the at least one third client device; and entering into Cellular Broadcast Information Broadcast over the SRWL (CBIBOS) mode with the at least one third client device.

In one alternative, the method may include controlling, by the processing device, at the first client device, when the at least one third client device as the PCD for the first client device which is a secondary client device (SCD) of the at least one third client device and the SCD are currently camped on to a same serving cell of a same Radio Access Technology (RAT) type and a same frequency, disabling system information (SI) change notification processing and SI channel decode processing disabled at the SCD as long as the SCD is connected with the PCD and entered into the CBIBOS mode; and periodically receiving the SI from the WWAN directly and checking the SI received from the WWAN whether a most recent SI for the currently camped on serving cell has been received.

In one alternative, the method may include controlling, by the processing device, at the first client device, when the at least one third client device as the PCD for the first client device which is a secondary client device (SCD) of the first client device and the SCD are currently camped on to different cells $C_a$ and $C_b$ of a same Radio Access Technology (RAT) type and a same frequency, disabling system information (SI) change notification processing and SI channel decode processing as long as the SCD is connected to the PCD and have entered the CBIBOS mode; and when a cell reselection is determined to occur in the PCD or the SCD, communicating with the PCD over the SRWL to determine whether to continue or exit the CBIBOS mode with the PCD.

In one alternative, the at least one third client device may be the PCD for the first client device which is a secondary client device (SCD) of the at least one third client device, and the method may further include controlling, by the processing device, at the first client device, transmitting over the SRWL a WWAN Camped on Cell Information Response message indicating a change-mark of most current system information (SI) decoded at the first client device.

In one alternative, the method may include controlling, by the processing device, at the first client device, when the at least one third client device as the PCD for the first client device which is a secondary client device (SCD) of the at least one third client device and the SCD are currently camped on to cells $C_{f1}$ and $C_{f2}$ respectively of different frequencies having a same Radio Access Technology (RAT) type, disabling a system information (SI) change notification processing and SI channel decode processing as long as the SCD is connected to the PCD and entered in the CBIBOS mode with the PCD; and when a cell reselection in the PCD or the SCD is determined, communicating with the PCD over the SRWL to determine whether to continue to be in or exit the CBIBOS mode with PCD.

In one alternative, the method may include controlling, by the processing device, at the first client device, when the at least one third client device as the PCD for the first client device which is a secondary client device (SCD) of the at least one third client device and the SCD are currently camped on to cells $C_{RAT1}$ and $C_{RAT2}$ respectively of different Radio Access Technology (RAT) types, disabling system information (SI) change notification processing and SI channel decode processing as long as the SCD is connected to the PCD and in the CBIBOS mode; and when a cell reselection in the PCD or the SCD is determined, communicating with the PCD over SRWL to determine whether to continue to be in or exit the CBIBOS mode with the PCD.

In one alternative, the at least one third client device may be the PCD for the first client device which is a secondary client device (SCD) of the at least one third client device, and the method may further include controlling, by the processing device, at the first client device, when a determination is the first client device is out of range of or disconnected from the PCD, exiting the CPDTOS mode and starting decoding at least one of a Paging Occasion (PO) or system information (SI) according a predetermined standard procedure.

In one alternative, the at least one third client device may be the PCD for the first client device which is a secondary client device (SCD) of the at least one third client device, and the method may further include controlling, by the processing device, at the first client device, when system information (SI) broadcast over the SRWL from the PCD with a timestamp is received at the SCD, validating the timestamp, determining whether to use or discard the received SI and decoding the SI for a given cell of the WWAN directly based on a determination whether a need for the SI decoding arises.

In one alternative, the method may include controlling, by the processing device, at the first client device, when the broadcast SI is received from the PCD with the timestamp, maintaining validity of the received stored SI for the given cell by monitoring a page message for the given cell.

In one alternative, the at least one third client device may be the PCD for the first client device which is a secondary client device (SCD) of the at least one third client device, and the method may further include controlling, by the processing device, at the first client device, when the SCD enters the CBIBOS mode, turning off a Radio Frequency (RF) receiver of a cellular modem of the SCD during a system information (SI) change notification time slot and a SI change time slot and entering a power save state.

In one alternative, the at least one third client device may be the PCD for the first client device which is a secondary client device (SCD) of the at least one third client device, and the method may further include controlling, by the processing device, at the first client, when a serving cell of the SCD is changed due to at least one of cell selection, cell reselection or cell change, communicating over the SRWL new cell information of the SCD to the PCD.

In accordance with an aspect of the present disclosure, an apparatus may provide for collaborative communication of broadcast information in a communication network in which a Short Range Wireless Links (SRWL) is established between a first client device and a plurality of second client devices, where the apparatus may include circuitry configured to control, at the first client device, receiving over the SRWL a broadcast Primary Client Device (PCD) Request message transmitted from each of a third client device and fourth client device of the second client devices; transmitting over the SRWL a PCD Accept message to each of the third and fourth client devices; and receiving over the SRWL broadcast information of a Wireless Wide Area Network (WWAN) through the third client device and the fourth client device.

In accordance with an aspect of the present disclosure, a wireless communication device may include a receiver to receive a wireless communication; and a processing device configured for collaborative communication of broadcast information in a communication network in which a Short Range Wireless Links (SRWL) is established between the wireless communication device and a plurality of second client devices, wherein the processing device is configured to control receiving over the SRWL a broadcast Primary Client Device (PCD) Request message transmitted from each of a third client device and fourth client device of the second client devices; transmitting over the SRWL a PCD Accept message to each of the third and fourth client devices; and receiving over the SRWL broadcast information of a Wireless Wide Area Network (WWAN) through the third client device and the fourth client device.

In accordance with an aspect of the present disclosure, apparatus may provide for collaborative communication of broadcast information in a communication network in which a Short Range Wireless Links (SRWL) is established between a first client device and a plurality of second client devices, where the apparatus may include: circuitry configured to control, at the first client device, receiving broadcast Primary Client Device (PCD) Request messages transmitted over the SRWL respectively from a plurality of third client devices of the second client devices and including received signal metrics; comparing the received signal metrics from the plurality of third client devices and selecting as a preferred PCD a selected client device of the third client devices determined to have a best received signal metric, such that the first client device is a secondary client device (SCD) of the selected client device; and transmitting over the SRWL a PCD Accept message to the selected client device.

In accordance with an aspect of the present disclosure, a wireless communication device may include a receiver to receive a wireless communication; and a processing device configured for collaborative communication of broadcast information in a communication network in which a Short Range Wireless Links (SRWL) is established between the wireless communication device and a plurality of second client devices, wherein the processing device is configured to control, receiving broadcast Primary Client Device (PCD) Request messages transmitted over the SRWL respectively from a plurality of third client devices of the second client devices and including received signal metrics; comparing the received signal metrics from the plurality of third client devices and selecting as a preferred PCD a selected client device of the third client devices determined to have a best received signal metric, such that the wireless communication device is a secondary client device (SCD) of the selected client device; and transmitting over the SRWL a PCD Accept message to the selected client device.

In accordance with an aspect of the present disclosure, an apparatus may provide for collaborative communication of broadcast information in a communication network in which a Short Range Wireless Links (SRWL) is established between a first client device and at least one second client device, where the apparatus may include circuitry configured to control, at the first client device, receiving over the SRWL a broadcast Primary Client Device (PCD) Request message, wherein the PCD Request message is transmitted from at least one third client device of the at least one second client device; transmitting over the SRWL a PCD Accept message to the at least one third client device; and receiving over the SRWL broadcast information of a Wireless Wide Area Network (WWAN) through the at least one third client device; and entering into Cellular Broadcast Information Broadcast over the SRWL (CBIBOS) mode with the at least one third client device.

In accordance with an aspect of the present disclosure, a wireless communication device may include a receiver to receive a wireless communication; and a processing device configured for collaborative communication of broadcast information in a communication network in which a Short Range Wireless Links (SRWL) is established between the wireless communication device and at least one second client device, wherein the processing device is configured to control, receiving over the SRWL a broadcast Primary Client Device (PCD) Request message, wherein the PCD Request message is transmitted from at least one third client device of the at least one second client device; transmitting over the SRWL a PCD Accept message to the at least one third client device; and receiving over the SRWL broadcast information of a Wireless Wide Area Network (WWAN) through the at least one third client device; and entering into Cellular Broadcast Information Broadcast over the SRWL (CBIBOS) mode with the at least one third client device.

DETAILED DESCRIPTION

Figure 1:
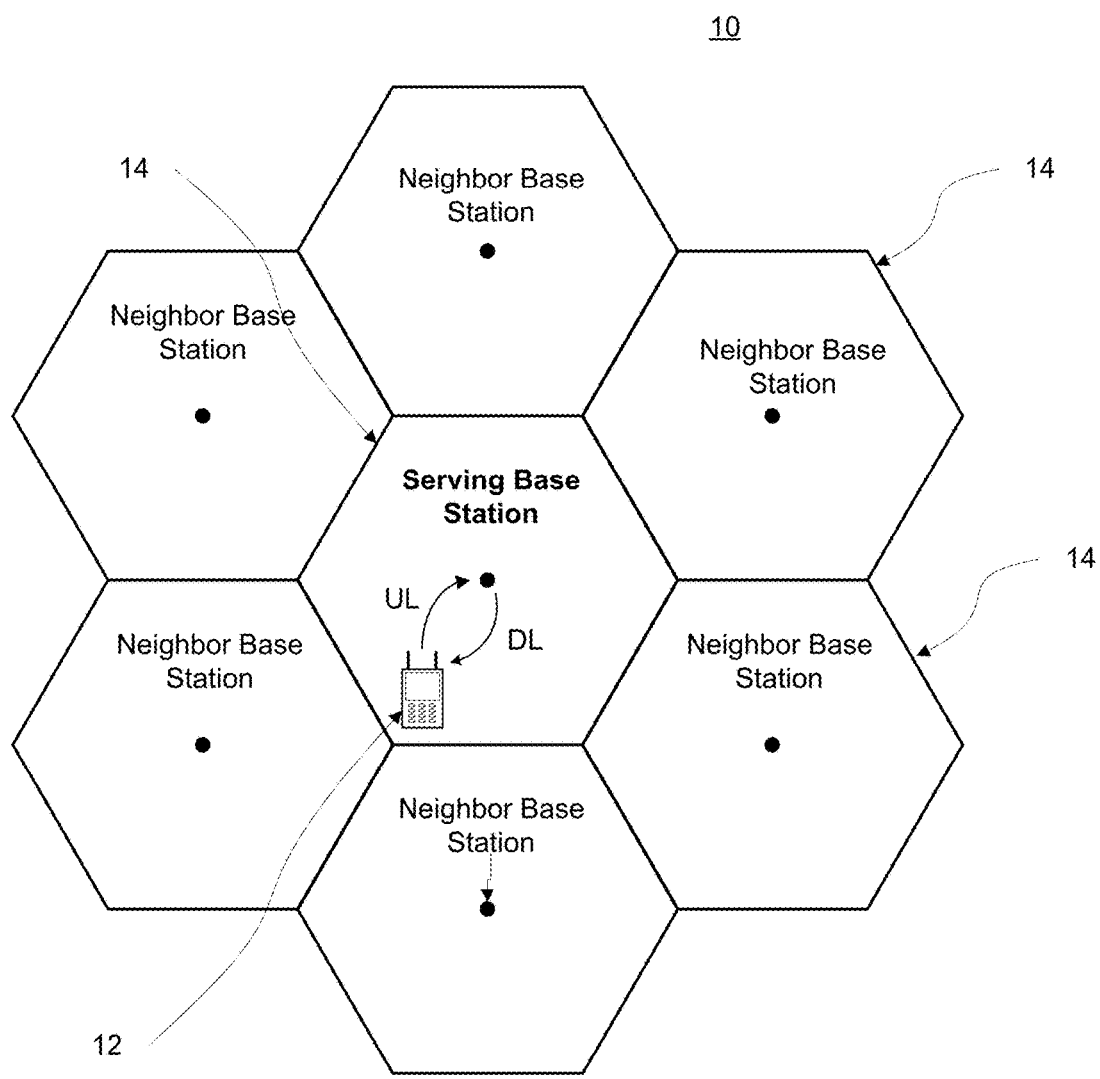
FIG. 1 illustrates a conventional mobile wireless communication system.
Figure 2:
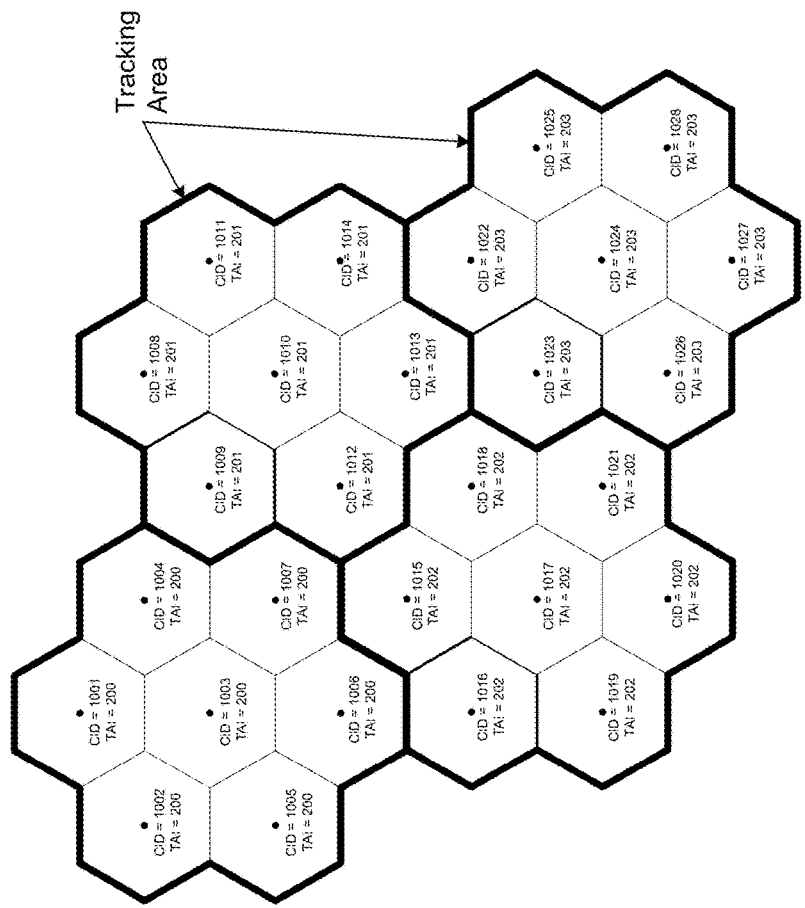
FIG. 2 illustrates the grouping of cells into tracking areas in a wireless communication system.
Figure 3:
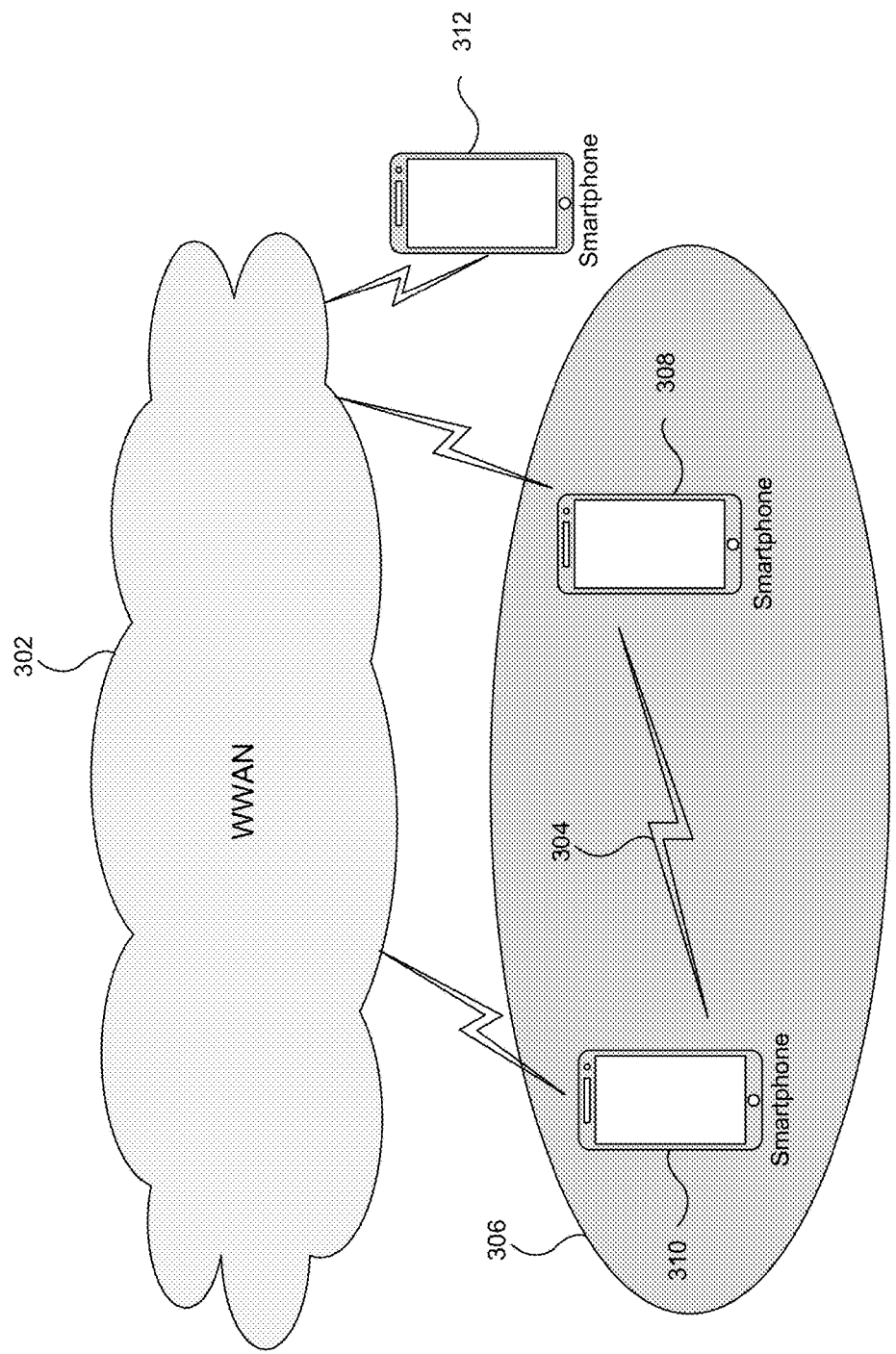
FIG. 3 illustrates a use case of two client devices in close proximity of each other using WWAN and SRWL.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Although the aspects of the present disclosure may use the 3GPP LTE as an example for a WWAN used by client devices, the aspects described herein are applicable to other WWAN such as 3GPP Wideband Code Division Multiple Access (WCDMA), High Speed Packet Access (HSPA), Global System for Mobile communication (GSM), General Packet Radio Service (GPRS), Code Division Multiple Access (CDMA), etc. Similarly, although the WLAN may be used as an example SRWL for the client devices, other SRWL such as Bluetooth™ may be used.

The types of client devices connected to a WWAN may vary. For example, a standard laptop or a desktop Personal Computer (PC), a tablet, etc. may be connected for internet service. Another type device, referred to as machine type device, may be deeply embedded devices inside appliances such as a refrigerator, a washer, a dryer, etc. which may use internet service. This type of devices may have different service requirements such as they may be more delay tolerant than other types of client devices. Another type of device may be a smartphone which may use multiple services such as internet, voice calls, SMS, etc. from the WWAN.

According to an aspect of the present disclosure, one or more client devices in a given local area may be capable of taking the role of receiving the broadcast information of a WWAN and relaying it to other client devices in the local area. The client device that may take the role of receiving the broadcast information of a WWAN and relaying it to other client devices is designated as Primary Client Device (PCD) and the client devices receiving the broadcast information from the PCD in the local area are referred to as Secondary Client Devices (SCDs). According to an aspect of the present disclosure, a client device may announce its capability and readiness to take the role of PCD by sending a broadcast message "PCD Request" over the SRWL. According to an aspect of the present disclosure, the one or more client devices receiving the "PCD Request" message over SRWL may determine to receive the WWAN broadcast information through the client device making the announcement and may send a "PCD Accept" message. After the "PCD Accept" message from one or more client devices is received by the client device, the client device that initiated the negotiation may be designated as the PCD. It may broadcast its role as PCD by sending a message "PCD Confirm" to conclude the negotiation. Once a PCD is established over a given SRWL, other client devices that accepted the established PCD are referred to as SCDs.

Figure 4:
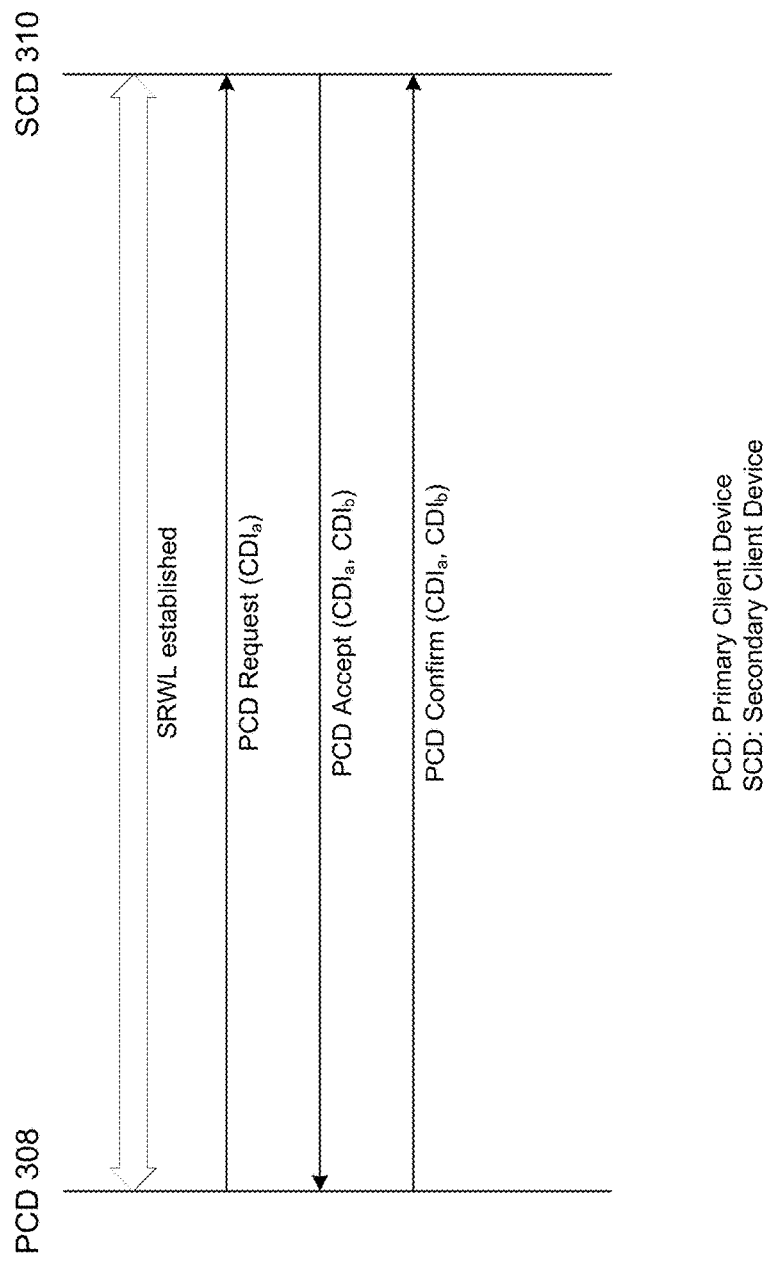
FIG. 4 illustrates a Message Sequence Chart (MSC) for an example scenario for establishing a Primary Client Device (PCD) in a Short Range Wireless Links (SRWL) according to the aspects of the present disclosure.

The Message Sequence Chart (MSC) for the messages exchanged between the client devices Smartphone 308 and the Smartphone 310 over the SRWL for establishing the PCD according to the aspects of the present disclosure is illustrated in FIG. 4. Initially, the SRWL link may be established between the client devices Smartphone 308 and the Smartphone 310 as per the protocols of the particular SRWL being used. The client device Smartphone 308 may broadcast a "PCD Request" message over the SRWL and the message may include its own CDI=$CDI_a$. The client device Smartphone 310 may receive this message and may determine to accept the Smartphone 308 as PCD and may broadcast over the SRWL the "PCD Accept" message which may include the CDI=$CDI_a$ of the Smartphone 308 and its own CDI=$CDI_b$. Upon receiving this message, the Smartphone 308 may check the first CDI that is part of the message and find that it is matching with its own CDI and may conclude that the Smartphone 310 has accepted it as a PCD. Finally, the Smartphone 308 may broadcast the "PCD Confirm" message which may include the CDI of both the Smartphone 308 and Smartphone 310. From this point forward, the Smartphone 308 may be established as the PCD for the Smartphone 310.

According to an aspect of the present disclosure, two or more client devices may simultaneously announce their capability and readiness to take the role of PCD by sending broadcast message "PCD Request" over the SRWL. According to an aspect of the present disclosure, the one or more client devices receiving the "PCD Request" message from the multiple announcement over SRWL may determine to receive the WWAN broadcast information through one of the client device making the announcement and may send a "PCD Accept" message which may include the identity of the client device making the announcement. After the "PCD Accept" message from one or more client devices is received by a client device that initiated the negotiation and the message includes its identity, then it may be designated as the PCD. The client device that made the announcement and first received the acceptance message from one of the client device may broadcast its role as PCD by sending a message "PCD Confirm" to conclude the negotiation. According to an aspect of the present disclosure, in a first alternative, the other client devices that made the announcement to take the role of PCD may revoke their offer by sending a "PCD Revoke" message. According to an aspect of the present disclosure, the client devices revoking their offer may accept the PCD role of the client device that first sent the "PCD Confirm" message. According to an aspect of the present disclosure, in a second alternative, there may be multiple PCDs in a single SRWL. According to an aspect of the present disclosure, the other client devices that made the announcement to take the role of PCD may retain their offer to serve as PCD and may continue to wait for configurable time for some client devices to accept their offer. According to an aspect of the present disclosure, some client devices may accept a different client device as a PCD by sending the "PCD Confirm" message to that client device.

According to an aspect of the present disclosure, some client devices may accept multiple client devices as their PCD. According to an aspect of the present disclosure, the client device with multiple PCDs may receive the WWAN broadcast information from multiple PCDs. The WWAN broadcast information from multiple PCDs may relate to the same cell or different cells depending on whether the two or more PCDs are camped on the same cell or different cells. According to an aspect of the present disclosure, a client device having multiple PCDs may have an increased likelihood of receiving the WWAN broadcast information from at least one PCD. The different SIBs that form the complete broadcast information may be decoded by different PCDs in different order. According to an aspect of the present disclosure, a client device with multiple PCDs may receive a subset of SIBs from one PCD and another subset from a different PCD and this in turn may lead to faster acquisition of the complete broadcast information.

Figure 5:
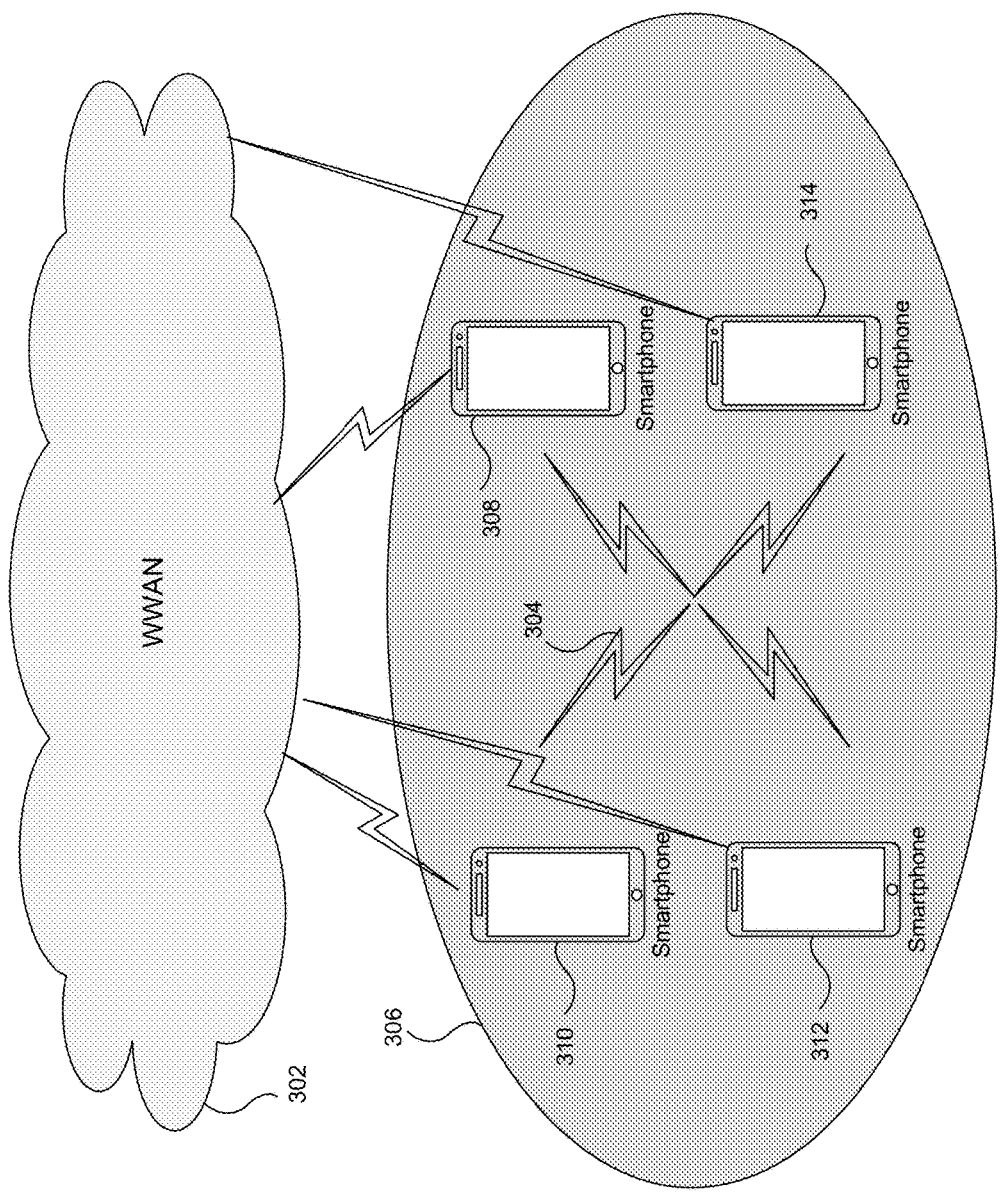
FIG. 5 illustrates a use case of more than two client devices in close proximity of each other using WWAN and SRWL.

An example of scenario is illustrated in FIG. 5 which includes the WWAN 302 and the SRWL 304 amongst the four client devices Smartphone 308, Smartphone 310, Smartphone 312 and Smartphone 314. The SRWL 304 has the coverage area 306. All four client devices are connected to the WWAN and directly with each other over the SRWL.

Figure 6:
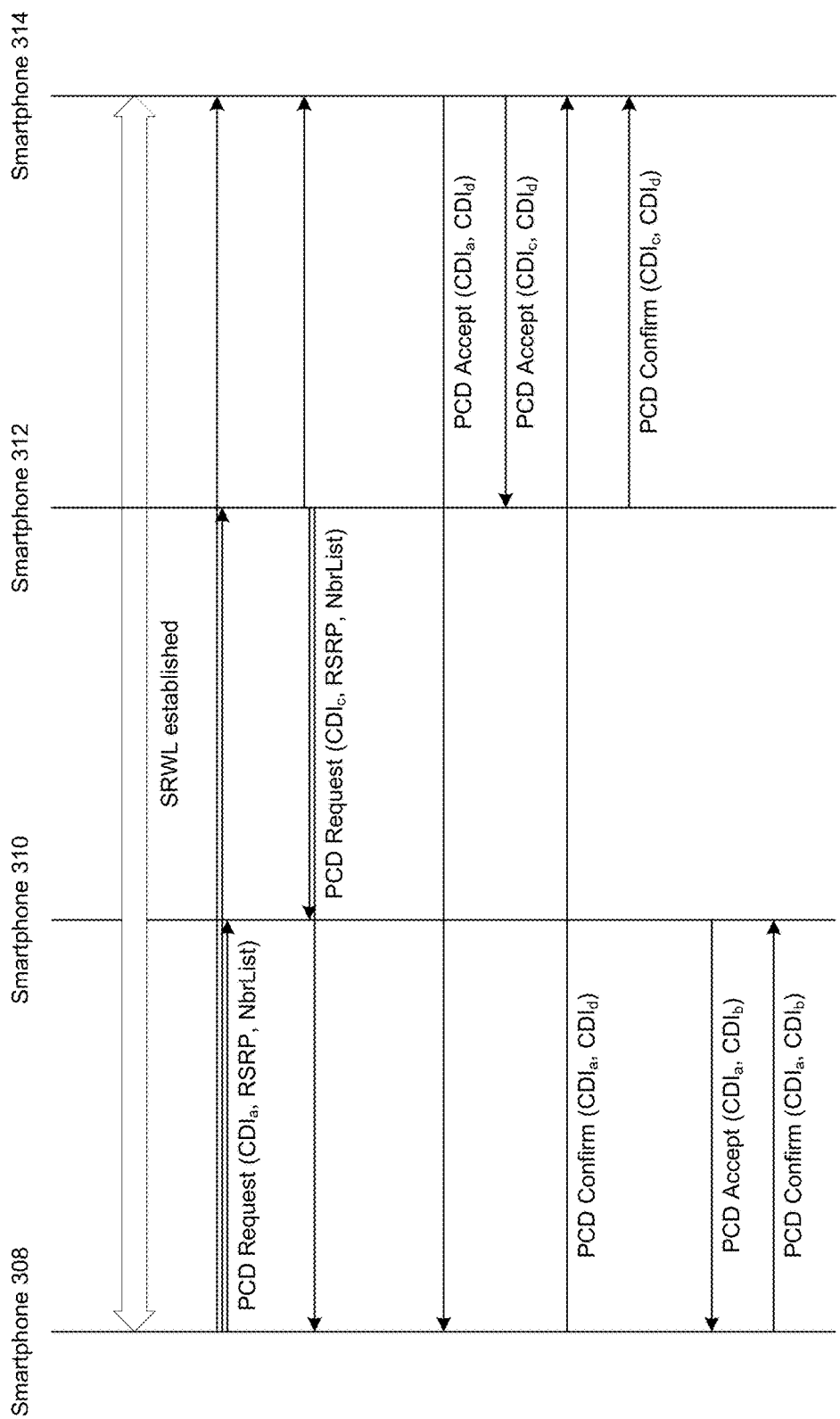
FIG. 6 illustrates an MSC for an example scenario for establishing multiple PCDs in an SRWL according to the aspects of the present disclosure.

The MSC for the case when multiple client devices simultaneously announce their capability and readiness to take the role of PCD is illustrated in FIG. 6. Initially, the SRWL link may be established amongst all four client devices as per the protocols of the particular SRWL being used. The client device Smartphone 308 may broadcast a "PCD Request" message over the SRWL and the message may include its own CDI=$CDI_a$. Immediately after that the client device Smartphone 312 may broadcast a "PCD Request" message over the SRWL and the message may include its own CDI=$CDT_c$.

The client device Smartphone 314 may receive both the "PCD Request" messages and may determine to accept both the Smartphone 308 and Smartphone 312 as PCDs and may broadcast over the SRWL two separate "PCD Accept" messages which may include the CDI pair ($CDI_a$, $CDI_d$) and the pair ($CDI_a$, $CDI_d$), where $CDI_d$ is the CDI of the Smartphone 314. Upon receiving the message with CDI pair ($CDI_a$, $CDI_d$), the Smartphone 308 may check the first CDI inside the message and find that it is matching with its own CDI and may conclude that the Smartphone 314 has accepted it as a PCD. Finally, the Smartphone 308 may broadcast the "PCD Confirm" message which may include the CDI of both the Smartphone 308 and Smartphone 314. From this point forward, the Smartphone 308 may be established as the PCD for the Smartphone 314. Similarly, upon receiving the message with CDI pair ($CDI_c$, $CDI_d$), the Smartphone 312 may check the first CDI inside the message and find that it is matching with its own CDI and may conclude that the Smartphone 314 has accepted it as a PCD. Finally, the Smartphone 312 may broadcast the "PCD Confirm" message which may include the CDI of both the Smartphone 312 and Smartphone 314. From this point forward, the Smartphone 312 may also be established as the PCD for the Smartphone 314. The client device Smartphone 310 may also receive both the "PCD Request" messages and may determine to accept only the Smartphone 308 as PCD and may broadcast over the SRWL a "PCD Accept" message which may include the CDI pair ($CDI_a$, $CDI_b$) where $CDI_b$ is the CDI of the Smartphone 310. Upon receiving the message with CDI pair ($CDI_a$, $CDI_b$), the Smartphone 308 may check the first CDI inside the message and find that it is matching with its own CDI and may conclude that the Smartphone 310 has accepted it as a PCD. Finally, the Smartphone 308 may broadcast the "PCD Confirm" message which may include the CDI of both the Smartphone 308 and Smartphone 310. From this point forward, the Smartphone 308 may be established as the PCD for the Smartphone 310.

The SCDs and/or PCDs may be mobile and may move away from the coverage of the SRWL. According to an aspect of the present disclosure, if an SCD has multiple PCDs and moves away from one of its PCDs, it may continue to receive the remaining WWAN broadcast information from the remaining PCDs. According to an aspect of the present disclosure, if one of the PCDs moves away from an SCD, it may continue to receive the remaining WWAN broadcast information from the remaining PCDs.

According to an aspect of the present disclosure, a PCD may determine to end its role as a PCD and may send a "PCD Revoke" broadcast message. According to an aspect of the present disclosure, the SCDs receiving this message may first determine whether there are any remaining PCDs on the SRWL. According to an aspect of the present disclosure, if there is at least one PCD remaining on the current SRWL, the SCD may continue to receive the WWAN broadcast information from the remaining PCD. According to an aspect of the present disclosure, if there is no PCD remaining on the current SRWL, the client device that was previously an SCD may determine to take the role of PCD by first resuming direct WWAN broadcast information reception on its own and then making the announcement using the "PCD Request" message. The further protocols for establishing a PCD are as per the aspects described earlier.

According to an aspect of the present disclosure, a client device with the best received signal metric may be preferred as a PCD. According to an aspect of the present disclosure, the client device making the announcement to take the role of PCD may include its received signal metrics in the "PCD Request" message. According to an aspect of the present disclosure, the client devices receiving this message from one or more client devices may compare their received signal metrics and may choose a client device with the best received signal metric as their preferred PCD. The received signal metric may be Received Signal Strength Indicator (RSSI), Reference Signal Received Power (RSRP), Reference Signal Received Quality (RSRP), Signal to Interference and Noise Ratio (SINR), etc.

According to an aspect of the present disclosure, the client device making the announcement to take the role of PCD may include its neighbor cells list in the "PCD Request" message. According to an aspect of the present disclosure when the client device sends the "PCD Request" message, it may only include the neighbor cells list for which the client device may be able to schedule the decoding of the broadcast information from the WWAN. The client device may have already decoded the broadcast information for one or more neighbor cells and may have a copy of the most recent broadcast information for several neighbor cells. According to an aspect of the present disclosure when the client device sends the "PCD Request" message, the client device may include in the neighbor cells list each neighbor cell for which the client device may already have the most recent decoded broadcast information from the WWAN. According to an aspect of the present disclosure the neighbor cells list included in the "PCD Request" message may include a neighbor cell for the client device having a same serving frequency as a current serving frequency of a cell serving the client device and/or neighbor cells having different frequency than the current serving frequency and/or neighbor cells having a different RAT than a RAT of the cell serving the client device.

According to an aspect of the present disclosure, in addition to the signal metric, a client device which sends the "PCD Request" message and which is camped on to the same cell as that of the SCD may be the first preferred PCD for a SCD. According to an aspect of the present disclosure, an SCD may prefer a PCD which may not be camped on to the same cell as that of the SCD, but may prefer a PCD which may include the SCD's currently camped on cell as one of the cell IDs in the neighbor cells list included in the "PCD Request" message. This order of preference may increase the probability for the SCD to receive the broadcast information for the currently camped on cell from PCD which is more time critical than the other neighbor cell broadcast information. The MSC in FIG. 6 illustrates the "PCD Request" messages that include the fields "RSRP" and "NbrList" indicating respectively the RSRP of the camped on cell and the list of neighbor cells for which the PCD may be able to decode SI or may already have decoded the most current SI.

After at least one PCD is established in a given SRWL, the actual relaying of the WWAN broadcast information over SRWL may be performed as described in U.S. patent application Ser. No. 15/233,488 filed Aug. 10, 2016, incorporated by reference herein. According to an aspect of the present disclosure, the PCD and the SCD may communicate through the SRWL and may exchange their WWAN capabilities such as the RAT type supported by them. For example, the PCD and the SCD may be supporting one or more of the following RAT types: CDMA, GSM, LTE, GPRS, etc.

According to an aspect of the present disclosure, the PCD and the SCD may communicate with each other the current WWAN identity (i.e., PLMN ID), the RAT type, the CID, the TAI, the frequency of the channel, default DRX cycle or paging cycle, etc. for the cell they are camped on. If there is more than one SCD connected to the PCD, each SCD communicates to the PCD the information about the cell it is camped on.

According to an aspect of the present disclosure, if the PCD and the SCD are currently camped on to the same cell, namely cell $C_a$, of the same RAT type and the same frequency, then the PCD may determine to broadcast the SI to SCD whenever there is a change in the SI from the current serving cell. At this point, according to an aspect of the present disclosure, both the PCD and SCDs may enter into Cellular Broadcast Information Broadcast over SRWL (CBIBOS) mode in which the SCD may disable the SI change notification processing and SI channel decode processing as long as it is connected to the PCD and has entered into CBIBOS mode. According to an aspect of the present disclosure, when there is a cell reselection in either PCD or SCD, then they may communicate with each other to determine whether they can continue to be in the CBIBOS mode or exit it. According to an aspect of the present disclosure, when there is more than one SCD for a given PCD, the same procedure is followed for each SCD.

Figure 7:
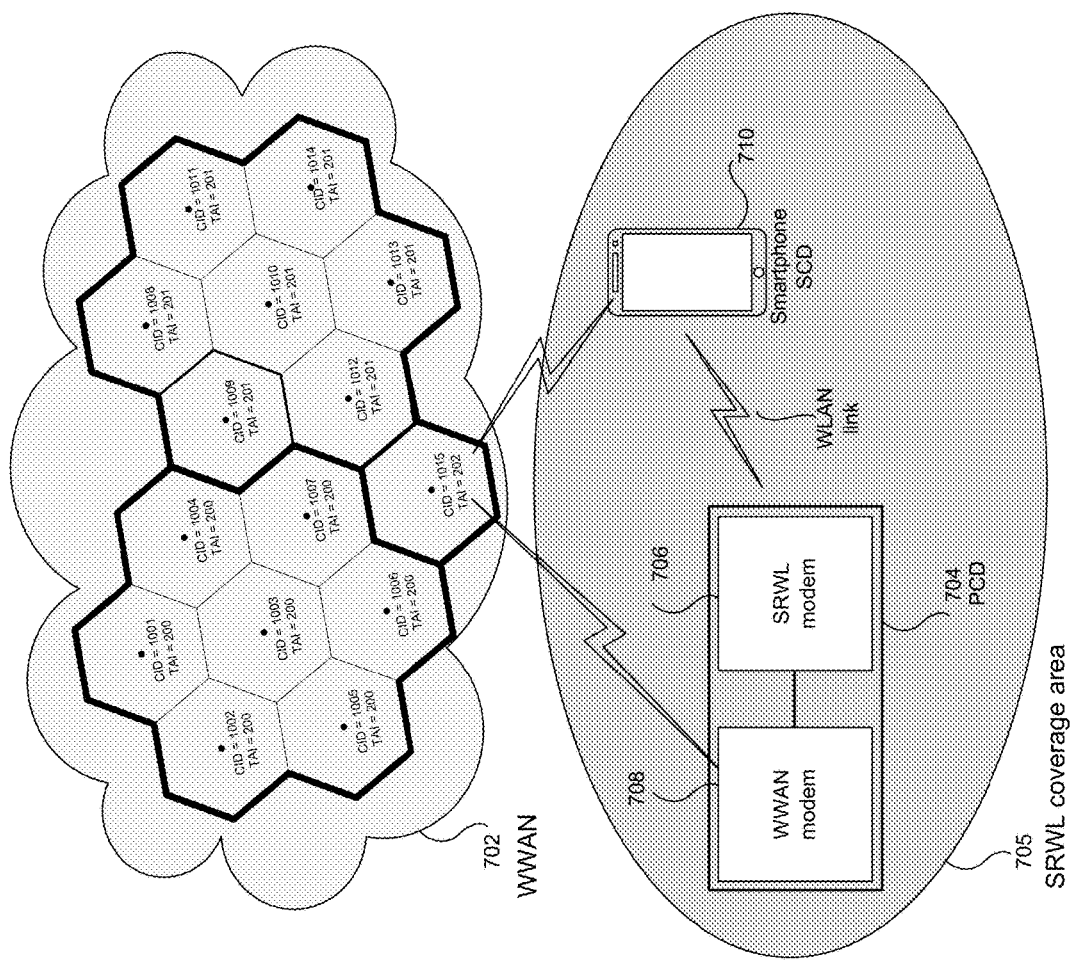
FIG. 7 illustrates an example scenario where a PCD and a client device may be camped on the same cell of the same WWAN.
Figure 8:
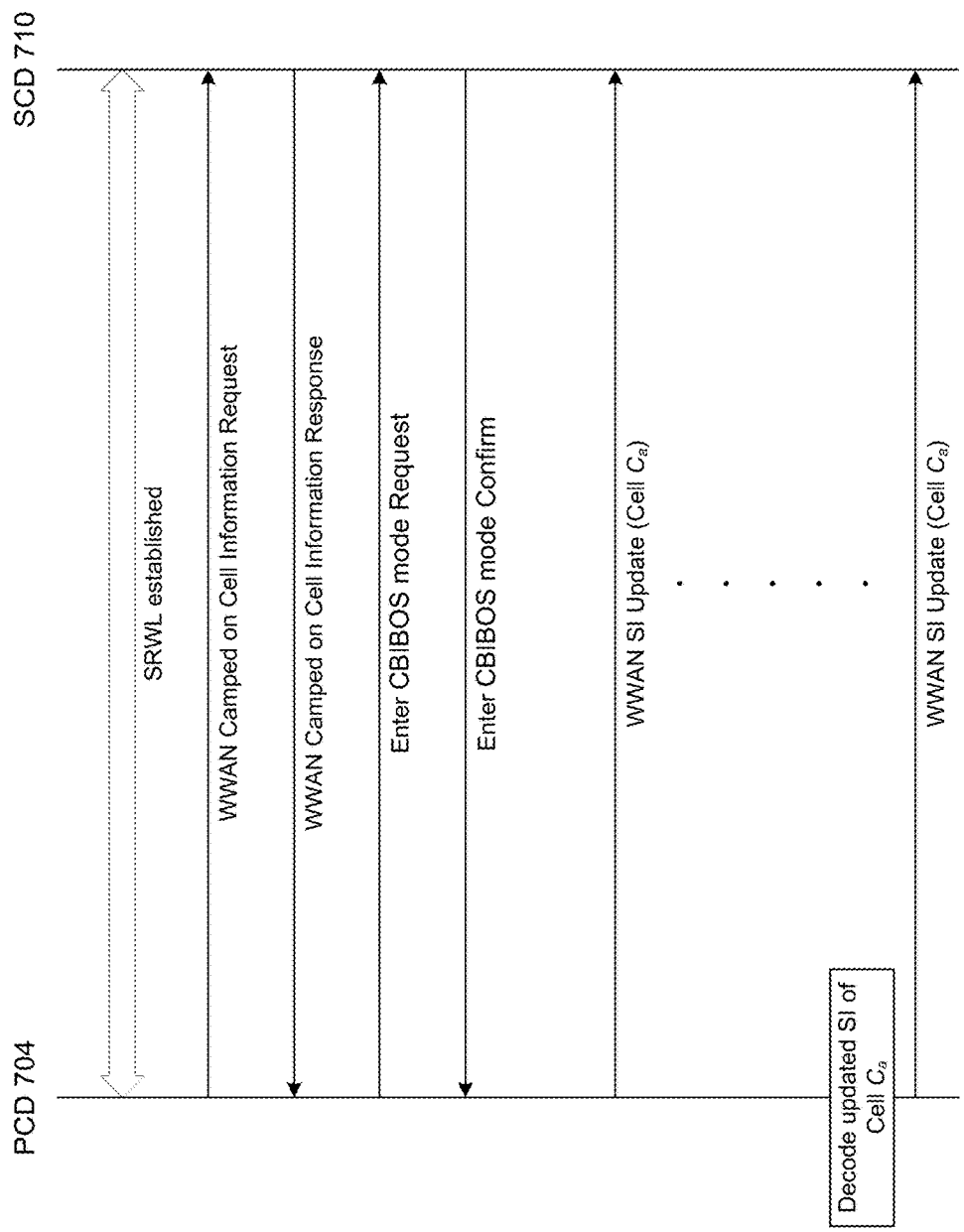
FIG. 8 illustrates an MSC for an example scenario for PCD broadcasting System Information (SI) on the WLAN SRWL according to the aspects of the present disclosure.

FIG. 7 illustrates an example scenario for the application of present disclosure. As shown in FIG. 7, WWAN coverage 702 and SRWL coverage 705 are illustrated. The PCD 704 comprises the SRWL modem 706 and WWAN modem 708. In another implementation both SRWL modem and WWAN modem may be a single unit. The WWAN modem 708 is connected to the cell with CID 1015 in the WWAN 702. The SCD 710 communicates with the PCD over the SRWL for internet services. The SCD 710 also communicates with the cell with CID 1015 for voice calls, SMS, and other services (except internet) provided by the WWAN 702. The Message Sequence Chart (MSC) for the messages exchanged between the PCD 704 and the SCD 710 over the SRWL for entering the CBIBOS mode according to the aspects of the present disclosure is illustrated in FIG. 8. The two entities PCD 704 and the SCD 710 involved in the message exchanges are illustrated at the top. Initially, the SRWL between the two entities may be established. Next the PCD 704 may send the "WWAN Camped-on Cell Information Request" message to the SCD 710 which in return may send the "WWAN Camped on Cell Information Response" message which may include the CID, TAI, frequency, the RAT type, and the PLMN ID of the cell on which the SCD 710 is camped on. Upon receipt of this information, the PCD 704 may compare it with the corresponding information about the cell it is camped on. In the present example, as illustrated in FIG. 7, both the PCD 704 and the SCD 710 are camped on the same cell, namely cell $C_a$ with CID=1015. Therefore, the PCD 704 may conclude that it is possible to enter the CBIBOS mode and may send a message "Enter CBIBOS mode Request" message to the SCD 710 which in turn may accept the request and send the "Enter CBIBOS mode Confirm" message to the PCD 704. At this point, the PCD 704 may send the most current SI it has for the cell it is camped on to the SCD 710 using the "WWAN SI Update" message. At this point, the SCD 710 may stop receiving any further SI from the WWAN directly. Subsequently, the PCD continues to monitor the SI for the cell it is camped on and if the SI has been updated by the WWAN, the PCD 704 sends the updated SI to the SCD 710 using another "WWAN SI Update" message.

Figure 9:
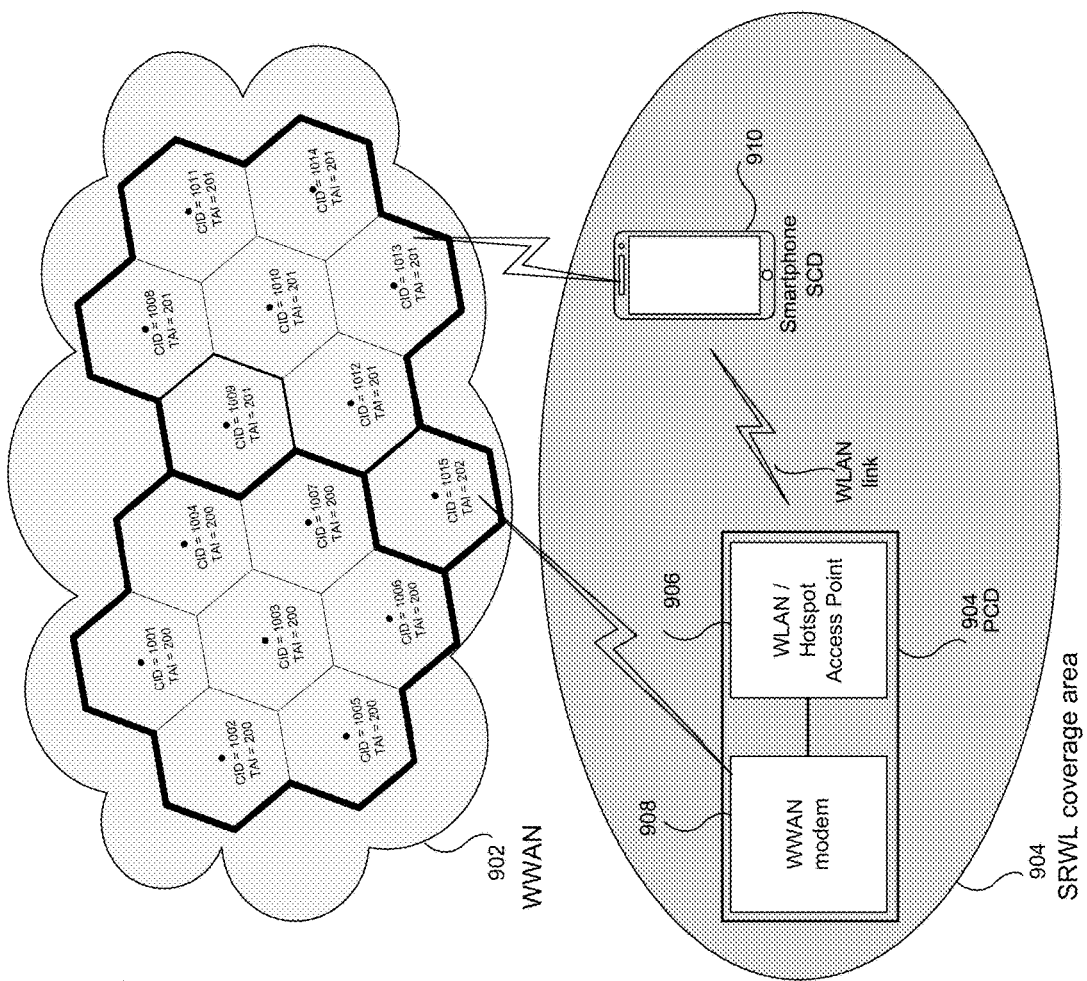
FIG. 9 illustrates an example scenario where a PCD and a client device may be camped on different cells of the same WWAN.

According to an aspect of the present disclosure, even after an SCD has entered the CBIBOS mode and may be relying on the PCD to provide updated SI, the SCD may periodically receive SI from WWAN directly to ensure that it has the most recent SI for the cell it is currently camped on. The periodicity of receiving SI directly from WWAN when an SCD is already in CBIBOS mode may be, for example, five times longer, than the periodicity of receiving SI directly from WWAN when the SCD is not in CBIBOS mode. When the SCD is in the CBIBOS mode, the periodicity in which the SCD receives the SI directly from WWAN to ensure the correctness of the SI may be a configurable parameter and it may derived by experimentation and simulations. According to an aspect of the present disclosure, if the PCD and one or more SCDs are currently camped on to the cells of the same RAT type and the same frequency but different cells, namely $C_a$ and $C_b$ respectively, then PCD may first determine whether it can decode the SI from cell $C_b$. According to an aspect of the present disclosure, if the PCD determines that it cannot decode the broadcast SI from cell $C_b$ then it may communicate to the one or more SCDs that CBIBOS mode may not be possible for those SCDs which are camped on cells different from that of the PCD. Note that a subset of the SCDs that may be camped on the same cell as the PCD may continue to remain in the CBIBOS mode. According to an aspect of the present disclosure, if the PCD determines that it can decode the broadcast SI from cell $C_b$, then the PCD may decode and relay the broadcast SIs from the cell $C_b$ to the SCDs as and when there is change in the SI from cell $C_b$ and both the PCD and SCDs enter the CBIBOS mode. Note that CBIBOS mode may be determined on a per cell basis, i.e., there may be CBIBOS mode information broadcast for a subset of SCDs that may be camped on cell $C_a$ and there may be a separate CBIBOS mode information broadcast for a subset of SCDs that may be camped on cell $C_b$. If there is another subset of SCDs camped on yet another cell of the same RAT type and on the same frequency, then yet another separate CBIBOS mode for the SI of that cell may be supported, and so on. According to an aspect of the present disclosure, the SCDs may disable the SI change notification processing and SI channel decode processing as long as they are connected to the PCD and have entered the CBIBOS mode. According to an aspect of the present disclosure, when there is a cell reselection in either PCD or one or more of the SCDs then they may communicate with each other to determine whether they can continue to be in the CBIBOS mode or exit the CBIBOS mode. FIG. 9 illustrates an example scenario for the application of present disclosure where the PCD 704 is camped on the cell $C_a$ with CID 1015 and the SCD 710 is camped on cell $C_b$ with CID 1013.

According to an aspect of the present disclosure, the "WWAN Camped on Cell Information Response" message may include, among other information, the change-mark of the most current SI it has decoded. This may enable the PCD to determine whether it has the most current SI for the cell that the SCD is camped on. If the PCD does not have the most recent SI for the cell that the SCD is camped on, the PCD may acquire the most recent SI and may use its change-mark to detect any future change of SI. The PCD may then determine whether it can enter the CBIBOS mode or not and may proceed accordingly.

According to an aspect of the present disclosure, when the PCD receives the "WWAN Camped on Cell Information Response" message and if the PCD is aware of an upcoming SI change or SI change is in progress for the cell the SCD is camped on, the PCD may wait till the completion of SI change and decode the most recent SI from the cell and then the PCD may determine whether it can enter the CBIBOS mode or not and may proceed accordingly.

According to an aspect of the present disclosure, when the PCD receives the "WWAN Camped on Cell Information Response" message and if the PCD is aware of an upcoming SI change or SI change is in progress for the cell the SCD is camped on, the PCD may enter the CBIBOS mode but may not immediately send the SI message available in its storage rather it may decode the updated SI from the cell and then may send the updated SI to the SCDs.

Figure 10:
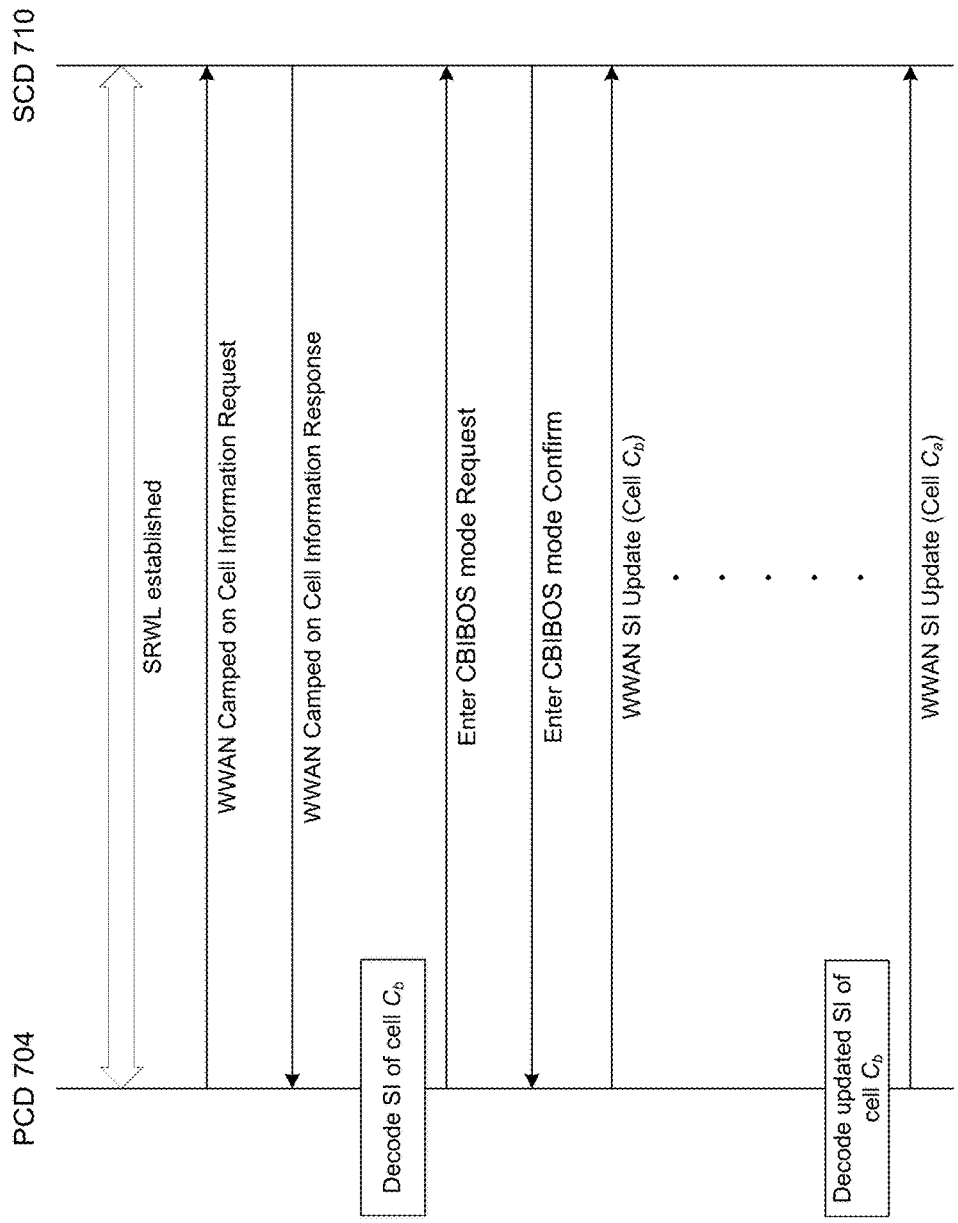
FIG. 10 illustrates an MSC for an example scenario for PCD broadcasting SI on the WLAN SRWL for a cell different from a cell it is camped on according to the aspects of the present disclosure.

The MSC for the messages exchanged between the PCD 704 and the SCD 710 over the SRWL for entering the CBIBOS mode when they are camped on different cells of the same frequency, RAT type, and PLMN according to the aspects of the present disclosure are illustrated in FIG. 10. The message exchanges are similar to the case illustrated in FIG. 8 for the case when both the PCD and the Smartphone are camped on the same cell. The key difference is that the PCD 704 first determines whether it can decode the SIBs from cell $C_b$ or not and if it can do so, it may actually decode the SIBs from Cell $C_b$. Only after it has the SIBs of the cell $C_b$ available to it, the PCD 704 sends the "Enter CBIBOS mode Request" message to the SCD 710. Subsequently, after having entered the CBIBOS mode, the PCD 704 may continue to monitor the cell $C_b$ for change of SIBs. Eventually if there is a change in SIBs is detected, the PCD 704 may decode the updated SIBs and send them to the SCD 710.

According to an aspect of the present disclosure, if the PCD and one or more SCDs are currently camped on to the cells of the same RAT type but different frequencies, namely cells $C_{f1}$ and $C_{f2}$ respectively, then PCD may first determine whether it can decode the SI from the cell $C_{f2}$ which may require the PCD to tune to frequency $f_2$ of the SCD cell while monitoring its own serving cell frequency $f_1$. According to an aspect of the present disclosure, if the PCD determines that it cannot decode the broadcast SI from cell $C_{f2}$ then it may communicate to the one or more SCDs that CBIBOS mode may not be possible for those SCDs which are camped on cells using different frequencies from that of the PCD. Note that a subset of the SCDs that may be camped on the same cell as the PCD and SCDs that may be camped on cells with the same frequency as the PCD may continue to remain in the CBIBOS mode. According to an aspect of the present disclosure, if the PCD determines that it can decode the broadcast SI from cell $C_{f2}$ then the PCD and SCDs may enter the CBIBOS mode and the PCD may decode and relay the broadcast SIs from the cell $C_{f2}$ to the SCDs as and when there is change in the SI from cell $C_{f2}$. Note that CBIBOS mode may be determined on a per cell basis, i.e., there may be CBIBOS mode information broadcast for a subset of SCDs that may be camped on cell $C_{f1}$ and there may be a separate CBIBOS mode information broadcast for a subset of SCDs that may be camped on cell $C_{f2}$. If there is another subset of SCDs camped on yet another cell of the same RAT type and different frequency, then yet another separate CBIBOS mode for the SI of cells on that frequency may be supported, and so on. According to an aspect of the present disclosure, the SCDs may disable the SI change notification processing and SI channel decode processing as long as they are connected to the PCD and have entered the CBIBOS mode. According to an aspect of the present disclosure, when there is a cell reselection in either PCD or one or more of the SCDs then they may communicate with each other to determine whether they can continue to be in the CBIBOS mode or exit the CBIBOS mode.

According to an aspect of the present disclosure, if the PCD and one or more SCDs are currently camped on to the cells of different RAT type, namely cells $C_{RAT1}$ and $C_{RAT2}$ respectively, then PCD may first determine whether it supports the RAT2 used by the SCDs and whether it supports the particular frequencies used by the RAT2, and whether it can decode the SI from the cell $C_{RAT2}$ which may require the PCD to tune to the frequency of $C_{RAT2}$ of the cell camped on by one or more SCDs while monitoring its own serving cell $C_{RAT1}$ of RAT type RAT1. According to an aspect of the present disclosure, if the PCD determines that it cannot decode the broadcast SI from cell $C_{RAT2}$ then it may communicate to the one or more SCDs that CBIBOS mode may not be possible for those SCDs which are camped on cells using different RAT type (RAT2) from that of the PCD. Note that a subset of the SCDs that may be camped on the same cell as the PCD and SCDs that may be camped on cells with the same and/or different frequency as the PCD may continue to remain in the CBIBOS mode. According to an aspect of the present disclosure, if the PCD determines that it can decode the broadcast SI from cell $C_{RAT2}$ then the PCD and SCDs may enter the CBIBOS mode and the PCD may decode and relay the broadcast SIs from the cell $C_{RAT2}$ to the SCDs as and when there is change in the SI from cell $C_{RAT2}$. Note that CBIBOS mode may be determined on a per cell basis, i.e., there may be CBIBOS mode information broadcast for a subset of SCDs that may be camped on cell $C_{RAT1}$ and there may be a separate CBIBOS mode information broadcast for a subset of SCDs that may be camped on cell $C_{RAT2}$. If there is another subset of SCDs camped on yet another cell of different RAT type and different frequency, then yet another separate CBIBOS mode for the SI of cells on that RAT type and frequency may be supported, and so on. According to an aspect of the present disclosure, the SCDs may disable the SI change notification processing and SI channel decode processing as long as they are connected to the PCD and have entered the CBIBOS mode. According to an aspect of the present disclosure, when there is a cell reselection in either PCD or one or more of the SCDs then they may communicate with each other to determine whether they can continue to be in the CBIBOS mode or exit the CBIBOS mode.

According to an aspect of the present disclosure, for the cases where the PCD agrees with the SCDs on monitoring and decoding SI for the SCDs camped on the same cells or different cells that may be on different frequencies or different RAT types, the PCD may monitor the downlink for all the agreed upon cells of different frequencies and RAT types. The PCD may manage its downlink monitoring schedule accordingly for respective cells. Generally the SI change notification may be monitored through a paging message in the respective cells of the same or different frequencies and RAT types. The paging message transmission may follow a predetermined scheduling and a particular paging message transmission instance is referred herein as Paging Occasion (PO).

According to an aspect of the present disclosure, the PCD may decide to monitor the PO for all the agreed upon cells on the same frequency or different frequencies and RAT types. According to an aspect of the present disclosure, the PCD may compute the POs for all the cells on the same or different frequencies and RAT types to determine the non overlapping POs which it can monitor for identifying the SI change for each the cells on the same or different frequencies and RAT types. Since the purpose of PO monitoring is only for SI change notification, the PCD may not be required to monitor the SCD specific PO in a cell of the same or different frequencies and RAT types. According to an aspect of the present disclosure the PCD may not monitor the same PO which the SCDs are expected to monitor in a cell, frequency, or RAT type. According to an aspect of the present disclosure, the PCD may just monitor one common default DRX cycle based PO per cell, frequency, or RAT type. This may give flexibility to the PCD to choose non overlapping PO for all the frequencies, RAT types, and cells that it plans to monitor the PO for SI change notification.

Note that a change in the DRX cycle typically may change the PO for the SCDs in that particular network. According to an aspect of the present disclosure, if the PCD finds an overlap in the POs of different cells in the same or different frequencies and RAT types, then it may change its DRX cycle for one or more of the cells, frequencies, or RAT types to determine whether the change in DRX cycle could change the POs such that the POs overlap may be avoided. According to an aspect of the present disclosure, if the PCD could not find the non-overlapping PO for the cells of the same or different frequencies and RAT types, then the PCD may communicate the same to the affected SCDs and exit the CBIBOS mode for those SCDs.

Figure 11:
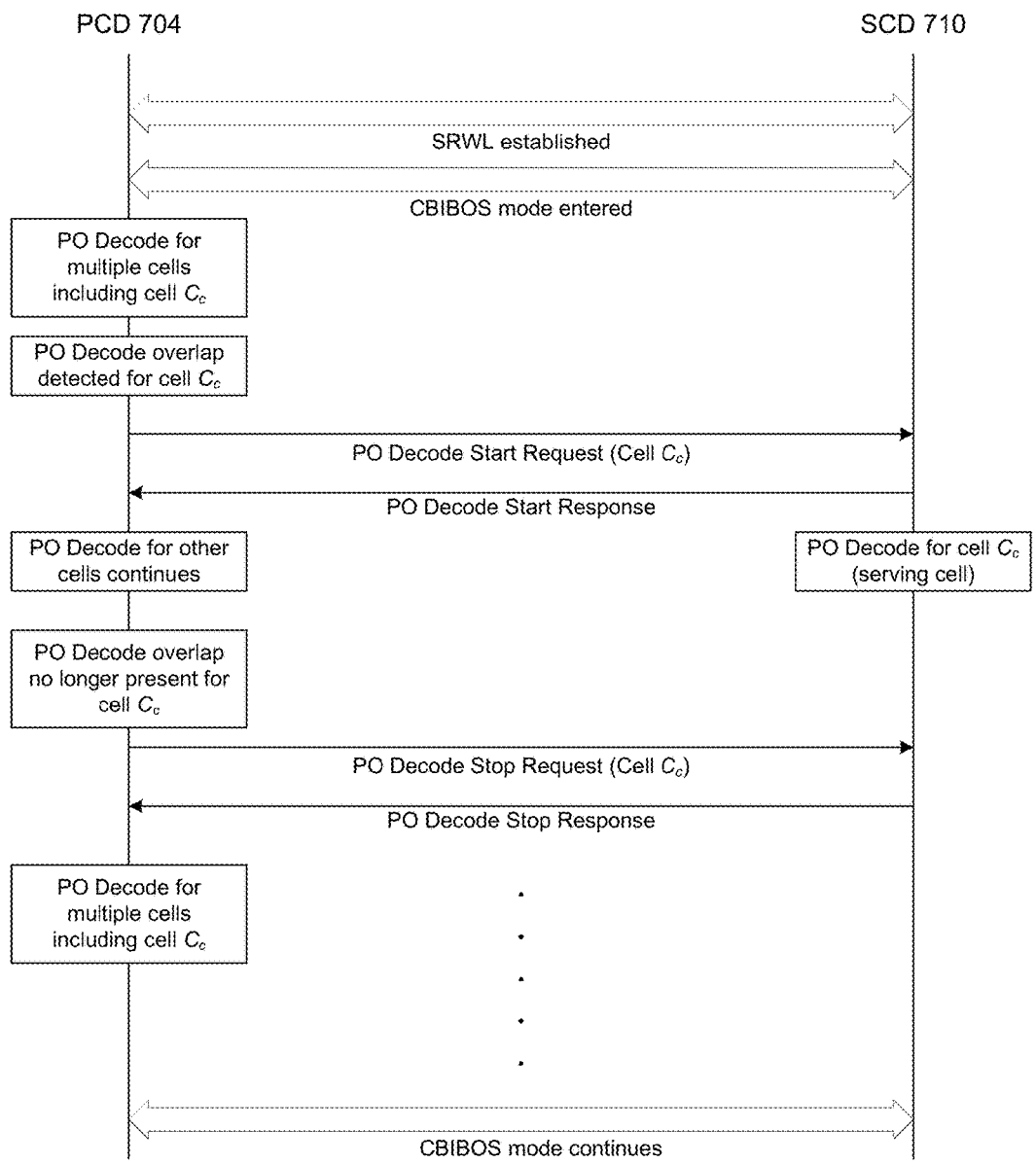
FIG. 11 illustrates an MSC for an example scenario for the handling of PO overlap in PCD followed by a client device performing PO decoding and then eventually removal of PO overlap according to the aspects of the present disclosure.

According to an aspect of the present disclosure, when the PCD attempts to decode SI for one or more of the cells of the same or different frequencies and RAT types, it may find an overlap with POs of other cells. In such a case, one of the two alternative methods as described next may be used. According to an aspect of the present disclosure, in the first alternative, the PCD may first prioritize the cells of the same frequency and RAT type in which the PCD is camped on. According to an aspect of the present disclosure, for the cells on other frequencies and RAT types, for which the PCD sees an overlap of the PO, the PCD may communicate to the SCDs that it may not be able to decode the next PO for the SCDs and request the SCDs to perform the PO decode by themselves and, according to an aspect of the present disclosure, the PCD may continue to be in CBIBOS mode with the SCD. This example scenario is illustrated in the MSC contained in FIG. 11. At the beginning, the PCD 704 and the SCD 710 have already entered into the CBIBOS mode. At this point, the PCD may monitor the PO for all the required cells including the inter-frequency cell $C_c$ on which the SCD 710 may be camped. Subsequently, for the current example scenario, the SI of the serving cell of the PCD may change which may lead to PO overlap for the inter-frequency cell $C_c$. At this time, the PCD may send the "PO Decode Start Request" message to the SCD 710 which may accept the request and send the "PO Decode Start Response" message to the PCD. Subsequently, the PCD 704 and the SCD 710 may continue to decode their respective PO's. Subsequently, the SI of the serving cell of the PCD may change which may lead to the removal of the PO overlap for the inter-frequency cell $C_c$. At this time, the PCD 704 may send the "PO Decode Stop Request" message to the SCD 710 which may accept the request and send the "PO Decode Stop Response" message to the PCD. From this point forward, the PCD may continue to monitor the PO for all the required cells and the SCD 710 may not monitor its own PO on the cell $C_c$.

Figure 12:
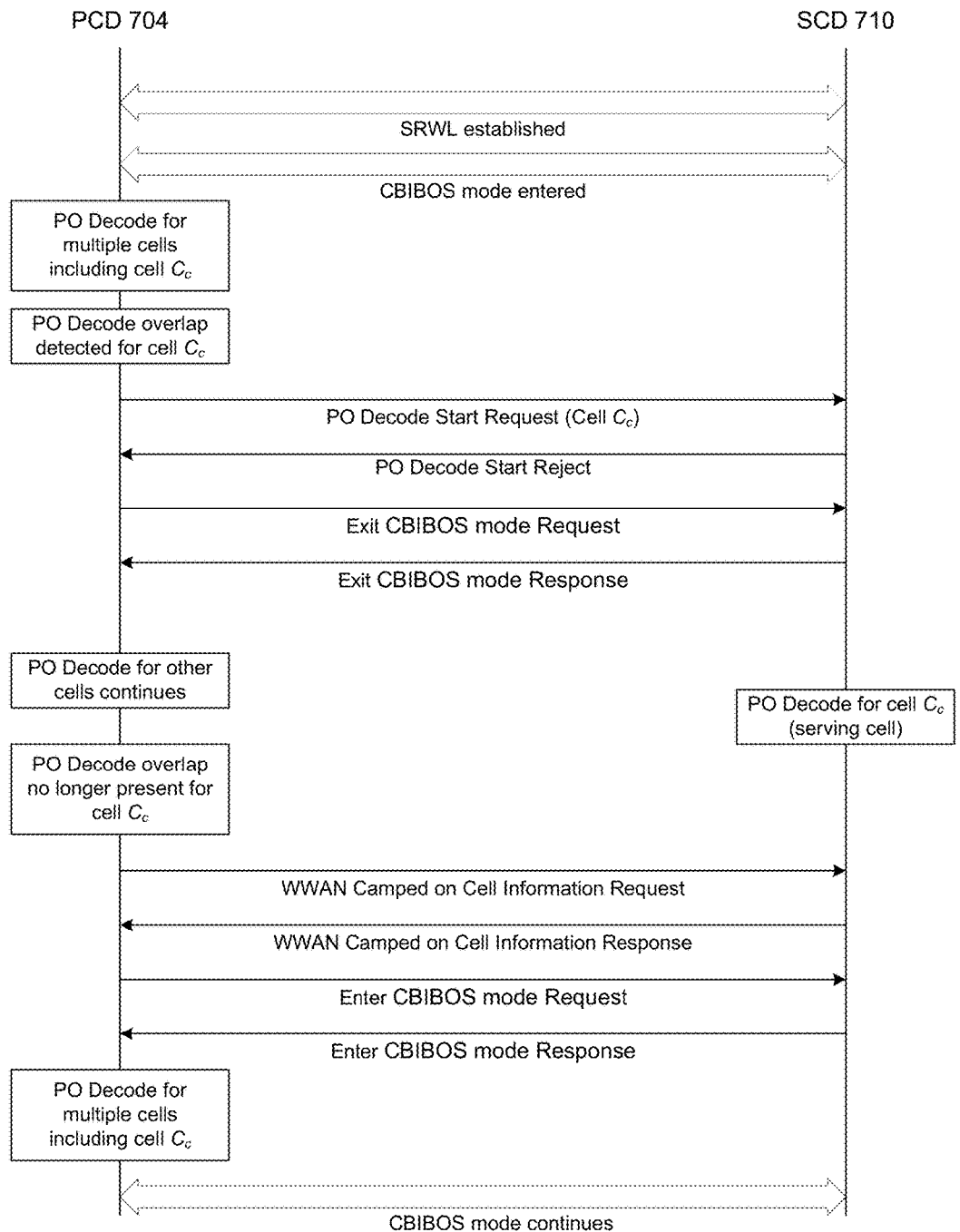
FIG. 12 illustrates an MSC for an example scenario for the handling of PO overlap in PCD followed by a client device rejecting PO decoding and then eventually removal of PO overlap according to the aspects of the present disclosure.

According to an aspect of the present disclosure, if the SCD denies the request from the PCD for decoding the PO and to continue to be in CBIBOS mode, then the PCD may exit the CBIBOS mode with the SCD and the SCD may perform normal PO decode and SI decode by itself. According to an aspect of the present disclosure, after completing the ongoing SI decode, if the PCD finds the non overlapping PO for one or more of SCDs for which it previously exited the CBIBOS mode or could not enter the CBIBOS mode because of the overlap in the PO in the past due to SI decode, the PCD may send either "WWAN Camped on Cell Information Request" or "Enter CBIBOS mode request" to one or more of such SCDs to request them to enter the CBIBOS mode. This example scenario is illustrated in the MSC contained in FIG. 12. At the beginning, the PCD 704 and the SCD 710 have already entered into the CBIBOS mode. At this point, the PCD 704 monitors the PO for all the required cells including the inter-frequency cell $C_c$ on which the SCD 710 may be camped. Subsequently, the SI of the serving cell of the PCD may change which may lead to PO overlap for the inter-frequency cell $C_c$. At this time, the PCD 704 may send the "PO Decode Start Request" message to the SCD 710 which may not accept the request and send the "PO Decode Start Reject" message to the PCD. At this time, the PCD 704 may send the "Exit CBIBOS mode Request" message to the SCD 710 which may accept the request and send the "Exit CBIBOS mode Response" message to the PCD. Subsequently, the PCD may continue to decode the POs for remaining required cells. The SCD 710 may take necessary steps, including possibly acquiring updated SI, etc., to resume PO decoding on its own. Subsequently, the SI of the serving cell of the PCD may change which may lead to the removal of the PO overlap for the inter-frequency cell $C_c$. At this time, the PCD 704 may send the "WWAN Camped on Cell Information Request" message to the SCD 710 which may accept the request and send the "WWAN Camped on Cell Information Response" message to the PCD. The PCD 704 may conclude that it is possible to enter the CBIBOS mode and may send a message "Enter CBIBOS mode Request" message to the SCD 710 which in turn may accept the request and send the "Enter CBIBOS mode Confirm" message to the PCD. From this point forward, the PCD may continue to monitor the PO for all the required cells and the SCD 710 may not monitor its own PO on the cell $C_c$.

According to an aspect of the present disclosure, in the second alternative, the PCD may prioritize the PO decoding of cells of other frequencies and RAT types, since PO decoding may be typically a higher priority and the PCD may defer the SI decode for cells on its camped on frequency and RAT type. This may be preferred alternative as there is usually periodic broadcast of SIs from each cell of the same or different frequencies and RAT types. According to an aspect of the present disclosure, the PCD may determine to defer the SI decode if the delayed decoding of SI may not impact the normal operation and performance of the PCD.

According to an aspect of the present disclosure, the PCD may decide not to monitor the PO of the cells of the same or different frequencies and RAT types and may rely on the SCDs for monitoring PO in their respective cells of the same or different frequencies and RAT types. According to an aspect of the present disclosure, when SCDs detects the change in SI, notified by the network in the PO, then the SCDs may communicate to the PCD that there is change in SI in the respective cell of the same or different frequencies or RAT type and then the PCD may decode the changed SI in the respective cell and broadcast the decoded SI to the one or more SCDs.

According to an aspect of the present disclosure, when a PCD may be built with multiple (for example, M) receiver/decoder circuits where it may decode in parallel even the overlapping POs and SIs from multiple (for example, N) cells of the same or different frequencies and RAT types. Note that M and N may not necessarily be the same.

According to an aspect of the present disclosure, when an SCD goes out of range with PCD then it may exit CBIBOS mode and may start decoding the PO and/or SI on its own as normal. The SCD may now be referred to as client device because it no longer has a PCD.

According to an aspect of the present disclosure, when an SCD disconnects with the PCD then it may exit CBIBOS mode and may start decoding the PO and/or SI on its own as normal. The SCD may now be referred to as client device because it no longer has a PCD.

According to an aspect of the present disclosure, the PCD at any point of time may communicate to SCDs and may exit CBIBOS mode. The PCD may also revoke its own role as a PCD by sending "PCD Revoke" message and may operate as a normal client device.

According to an aspect of the present disclosure, a client device may autonomously take the role of PCD and then may enter CBIBOS mode autonomously and may start broadcasting its current serving cell SI information. A client device may use this method when there is at least one other client device is connected on the SRWL. The client device may use this autonomous method whenever there is an update or change in SI in its serving cell and it successfully decodes the updated SI.

According to an aspect of the present disclosure, a client device may autonomously take the role of PCD and then may enter CBIBOS mode autonomously and may start broadcasting all the stored cell SI information which are most recent from the WWAN. A client device may use this method when there is at least one other client device connected on the SRWL. The client device may use this autonomous method whenever there is an update or change in SI for any of the stored cells in its database and it successfully decodes the updated SI for any of the cell in its stored cells database.

According to an aspect of the present disclosure, when the PCD broadcasts the SI for the cell from its stored information database, the PCD may send the timestamp along with the stored cell SI information. According to an aspect of the present disclosure, the timestamp for a cell may represent the most recent update of the SI for that cell. The PCD may use the standard timestamp e.g., Global Positioning System (GPS) time or Greenwich Mean Time (GMT) as a reference while sending the timestamp for the SI of a cell.

According to an aspect of the present disclosure, when the SCD receives the broadcast SI from the PCD with timestamp, the SCD may validate the timestamp and may decide to use the received SI or may discard the received SI and may decode the SI for those cells on its own from WWAN directly if and when the need arises.

According to an aspect of the present disclosure, when the SCD receives the broadcast SI information from the PCD with timestamp, the SCD may validate the timestamp and may continue to maintain the validity of the received stored information cell SI by monitoring the page message for those cells.

Figure 13:
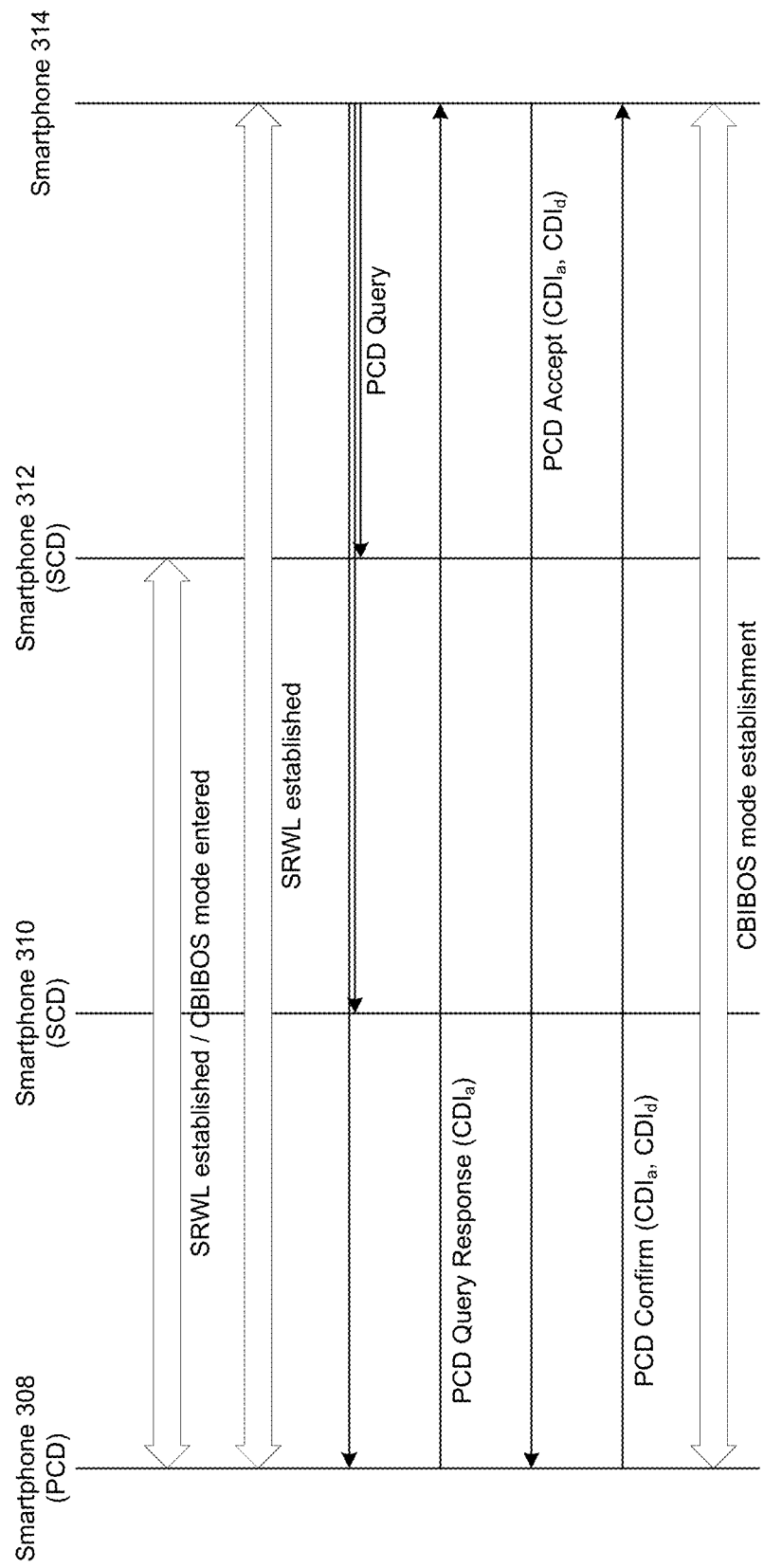
FIG. 13 illustrates an MSC for an example scenario for the handling of a new client device entering SRWL and entering Cellular Broadcast Information Broadcast over SRWL (CBIBOS) mode according to the aspects of the present disclosure.

According to an aspect of the present disclosure, when a new client device enters the SRWL then the newly entered client device may send a broadcast query message "PCD Query" requesting for presence of any PCD. According to an aspect of the present disclosure, if a client device receives the "PCD Query" message and if the client device can act as a PCD or is already acting as a PCD, then the client device may send "PCD Query Response" message and the newly entered client may send "PCD Accept" message and the PCD may send the "PCD Confirm" message and the newly entered client device becomes an SCD. The MSC in FIG. 13 illustrates an example of a new client device Smartphone 314 entering the SRWL in which the Smartphone 308 is already established as a PCD and the Smartphone 310 and Smartphone 312 are established as SCDs according to the aspects of the present disclosure.

Figure 14:
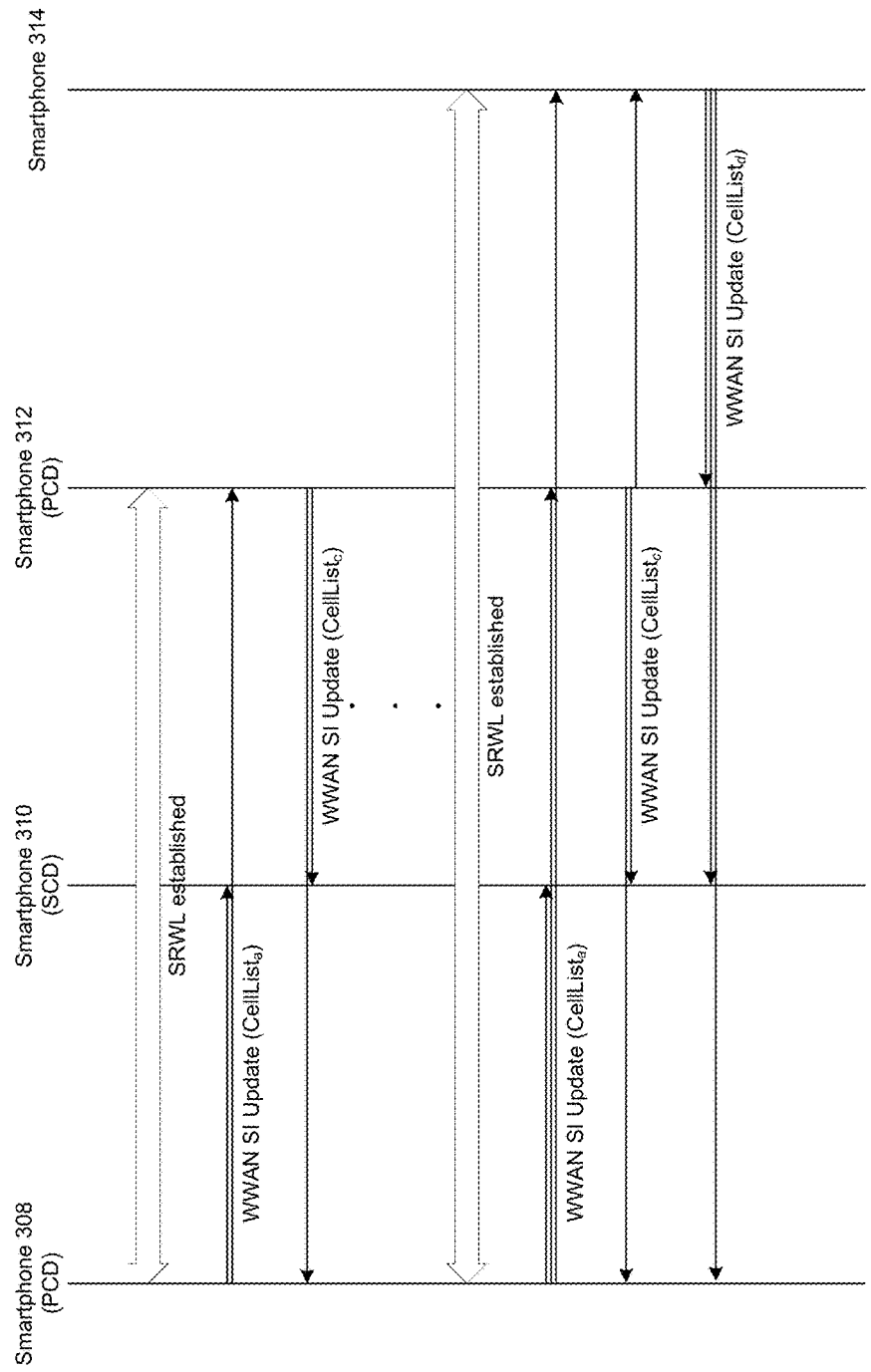
FIG. 14 illustrates an MSC for an example scenario for the autonomous broadcast of SI from multiple client devices and a new client device entering SRWL which also autonomously broadcasts SI according to the aspects of the present disclosure.

According to an aspect of the present disclosure, there may be more than one or all the client devices on an SRWL that can act as PCD and may send autonomous broadcast message with their stored SI for camped on and neighbor cells with timestamp whenever a new client device enters their SRWL. According to an aspect of the present disclosure, even the newly entered client device may broadcast its stored SIs to other client devices when it enters the SRWL even if the other client devices may be PCDs. According to an aspect of the present disclosure, the client devices that act as PCD may send autonomous broadcast message in the SRWL whenever their stored SIs are updated. The MSC in FIG. 14 illustrates an example of a new client device Smartphone 314 entering the SRWL in which the Smartphone 308 and Smartphone 312 are already autonomously acting as PCDs and the Smartphone 310 is autonomously acting as SCD according to the aspects of the present disclosure. The Smartphone 308 is camped on cell $C_a$ and broadcasts the stored SI for the camped on cell and the neighbor cells in the "WWAN SI Update" message which includes the SIs for CellList$_a$ corresponding to camped on cell $C_a$. The Smartphone 312 is camped on cell $C_c$ and broadcasts the stored SI for the camped on cell and the neighbor cells in the "WWAN SI Update" message which includes the SIs for CellList$_c$ corresponding to camped on cell $C_c$. Subsequently, Smartphone 314 joins the SRWL and may determine to act as a PCD autonomously. Upon detection of Smartphone 314 joining the SRWL, the Smartphone 308 and Smartphone 312 broadcast their respective stored SI for their respective camped on cell and the neighbor cells in the "WWAN SI Update" messages. The Smartphone 314 is camped on cell $C_d$ and broadcasts the stored SI for the camped on cell and the neighbor cells in the "WWAN SI Update" message which includes the SIs for CellList$_d$ corresponding to camped on cell $C_d$.

This broadcast nature of all the client devices in autonomous mode may assist each of the client devices to take advantage of each others' stored SI and may expedite the SI acquisition and in turn may accelerate WWAN connection setup and may reduce power consumption.

According to an aspect of the present disclosure, a client device that can take the role of a PCD may be pre-configured with a set of cells of the same or different frequencies, RAT type for which it is expected to monitor and/or decode SI change from the respective cells. The client device may autonomously take the role of PCD and may enter CBIBOS mode autonomously and may start broadcasting the SIs for one or more of the pre-configured cells of the same or different frequencies and RAT types.

According to an aspect of the present disclosure, the PCD may do the SI broadcast using an application which may run in the PCD and in the SCDs and the applications on the two entities may communicate through a peer to peer protocol on any logical channel of the underlying SRWL being used. According to an aspect of the present disclosure, the peer to peer application may be independent of the particular SRWL being used and it may be achieved through a virtual communication port established in both PCD and in the SCDs. The SRWL connection may be mapped to the virtual communication port and the applications may communicate using the virtual communication port. For example, in case of WLAN SRWL, it could be a Transmission Control Protocol/Internet Protocol (TCP/IP) socket based communication between the PCD and the SCDs.

According to an aspect of the present disclosure, the PCD and the SCDs may create a new physical or logical channel, namely Cellular Broadcast Information Channel (CBIC), which may be pre-negotiated and dedicated for the CBIBOS mode information exchange. This CBIC may be defined with a periodicity and time slot where the PCD may broadcast the updated SI and the SCDs may monitor the CBIC on a pre-defined agreed upon periodicity and time slot to receive the updated SI message from the PCD. According to an aspect of the present disclosure the PCD and the SCD may use the CBIC for other cellular network information exchange (other than SI) between the SCD and the PCD.

According to an aspect of the present disclosure, when the PCD broadcasts the SI messages, it may prefix each SI message with the SI change-mark index to ensure the SCDs know the change-mark index of the SI broadcast by the PCD. This may help the SCDs to cope with the out of order reception of SI messages from one or more PCD.

A PCD may be equipped with more than one source for primary sources of internet. For example, a PCD may be equipped with a cable modem and a WWAN modem. According to an aspect of the present disclosure, a PCD may be using the cable modem to provide internet service while it may be using the WWAN modem strictly for SI monitoring and decoding purposes, i.e., a PCD need not be using the WWAN for providing internet service in order to only monitor the SI from WWAN cells.

An SCD operating according to the aspects of the present disclosure may go in power save mode without monitoring change of SI and decoding of SI which may lead to reduced power consumption and extended battery life. According to an aspect of the present disclosure, when the SCD enters the CBIBOS mode, the SCD may turn off the RF receiver of the cellular modem during the SI change notification time slot and the SI change time slot and may enter power save state. This may be a significant advantage for deeply embedded SCDs powered with limited capacity batteries. For the case where the PCD and SCDs are camped on the same cell of the same frequency and the same RAT type, the PCD need not do any additional decoding. This is likely to be the most common case when the PCD and SCDs have the service from the WWAN with the same PLMN. When a SCD first connects with the PCD, there is a high probability the SCD may camp on to the same cell if both are getting service from the WWAN with the same PLMN, then the SCD may get the updated SI sooner than compared to when it decodes on its own directly from the WWAN.

According to an aspect of the present disclosure the PCD may save in its database the most recent SI messages decoded for its SCD from a cell on the same or different frequencies and/or different RAT types. According to an aspect of the present disclosure, the PCD may save in its database SI messages for R recent camped on or neighbor cells of the same or different frequencies and/or RAT type SI messages. Example values of R may be 10 or 20 or 50 and it may be determined based on simulation results or experiments and the value of R may be preconfigured in the PCD.

According to an aspect of the present disclosure the PCD may maintain the validity for the stored SI message in its database. The PCD may maintain the validity by refreshing the validity duration every time it decodes a PO and detects there is SI change. The validity timer and the method to identify the validity for the stored SI may be different for cells of the same or different frequencies and/or RAT types.

The PCD may do cell selection or reselection or change to a cell of the same or different frequencies and/or RAT types for which the PCD may already have valid stored SI information which the PCD may have decoded as part of SI monitor for SCDs connected to it. According to an aspect of the present disclosure, the PCD may use the valid stored SI information for a cell of the same or different frequencies and/or RAT types even though the stored SI message may have been decoded as part of SI monitoring for other SCDs.

According to an aspect of the present disclosure, when the PCD changes its serving cell due to cell selection or cell reselection or cell change or other procedure, the PCD may broadcast its new cell information to the SCDs.

According to an aspect of the present disclosure when a SCD changes it serving cell due to cell selection or cell reselection or cell change or other procedure the SCD may communicate its new cell information to the PCD.

Figure 15:
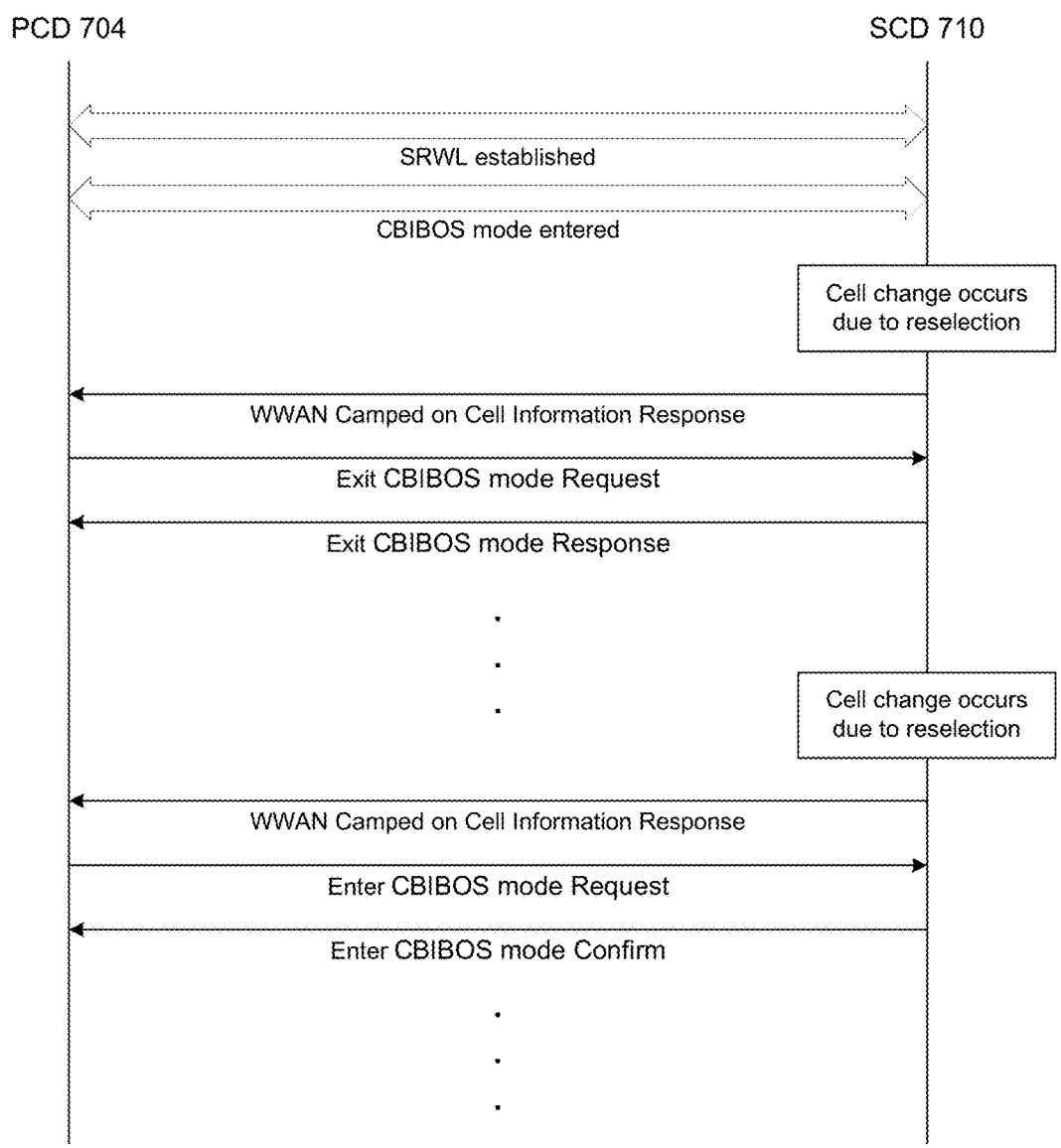
FIG. 15 illustrates an MSC for an example scenario for the handling of cell reselection by client device leading to the end of CBIBOS mode followed by another reselection leading to entering of CBIBOS mode according to the aspects of the present disclosure.

According to an aspect of the present disclosure, when the PCD and the SCDs are in CBIBOS mode and if a cell change occurs in either PCD or in one or more of the SCDs and if the PCD may not able to continue the CBIBOS mode with one or more of the SCDs then the PCD may send "Exit CBIBOS mode Request" to one or more of the SCDs and may exit the CBIBOS mode with those SCDs. An example of this type of scenario is illustrated in FIG. 15 where initially the PCD 704 and the SCD 710 are in CBIBOS mode. At some point the SCD 710 may perform cell reselection and to ensure that the CBIBOS mode can be continued, it may send the "WWAN Camped on Cell Information Response" message to the PCD to update its serving cell information. The PCD 704 may determine that it may not be able to support the CBIBOS mode for the SCD 710 for the newly selected cell. Therefore, the PCD 704 may send the "Exit CBIBOS mode Request" message to the SCD 710 which may accept the request and send the "Exit CBIBOS mode Response" message to the PCD. At further later point in time, the SCD 710 may perform another cell reselection and to ensure that the CBIBOS mode can be entered, it may send the "WWAN Camped on Cell Information Response" message to the PCD to update its serving cell information. The PCD 704 may determine that it may be able to support the CBIBOS mode for the SCD 710 for the newly selected cell. Therefore, the PCD 704 may send the "Enter CBIBOS mode Request" message to the SCD 710 which may accept the request and send the "Enter CBIBOS mode Response" message to the PCD. From this point forward, the PCD may continue to monitor the PO and the SI for the serving cell of the SCD 710.

Figure 16:
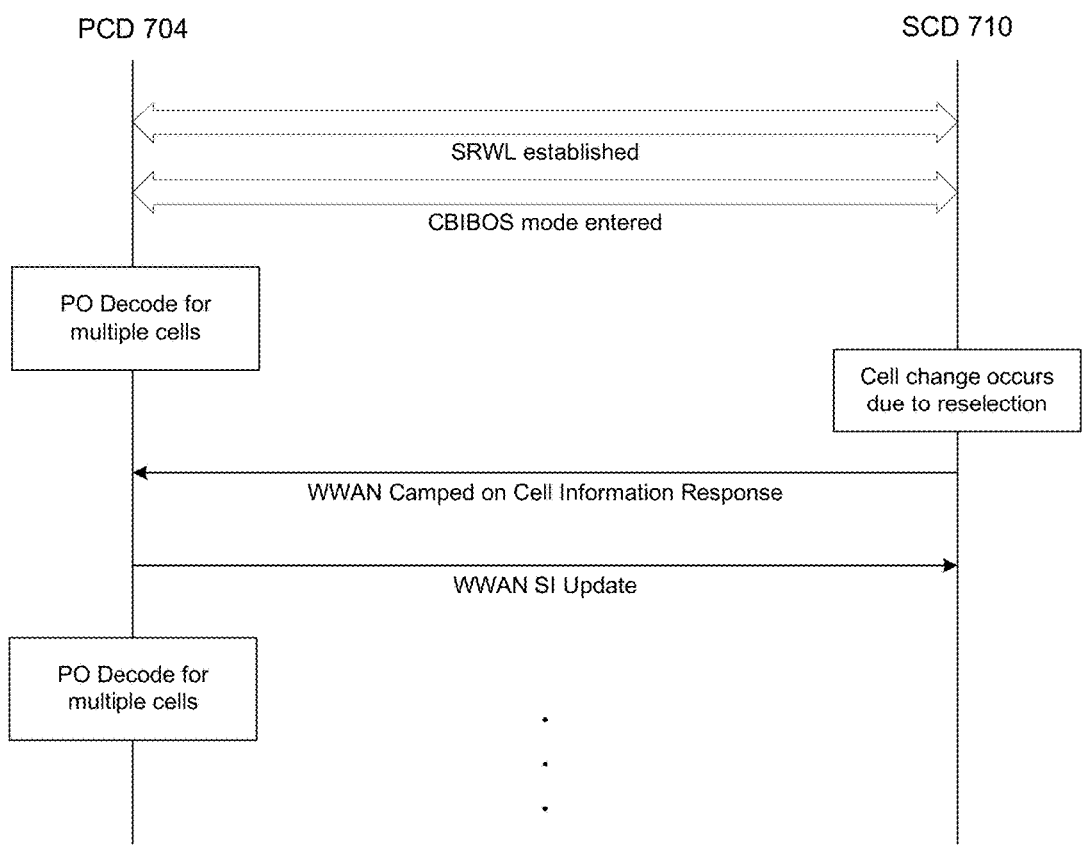
FIG. 16 illustrates an MSC for an example scenario for the handling of cell reselection by client device to a cell for which the PCD already has valid SI which it sends to the client device and continues the CBIBOS mode uninterrupted according to the aspects of the present disclosure.

According to an aspect of the present disclosure, when the PCD receives a cell change notification from a SCD and if the PCD has valid stored SI information for the newly notified cell of the same or different frequencies and/or RAT types, then the PCD may immediately send the valid stored SI information to the SCD. This may potentially expedite the SI acquisition for the SCD and may expedite the SCD network access for a faster connection setup after cell change in the SCD. An example scenario of this aspect is illustrated in FIG. 16 where initially the PCD 704 and the SCD 710 are in CBIBOS mode. At some point, the SCD 710 may perform cell reselection and may camp on a different cell. To ensure that the CBIBOS mode can be continued, the SCD 710 may send the "WWAN Camped on Cell Information Response" message to the PCD to update its serving cell information. The PCD may look up its database of valid SI for various cells and may determine that it already has valid SI for the cell the SCD 710 has newly camped on. The PCD 704 may immediately send the "WWAN SI Update" with the SI for the serving cell of the SCD 710. The PCD and the SCD 710 continue to remain in the CBIBOS mode even after change of cell and the SCD 710 did not have to decode the SI by itself.

Figure 17:
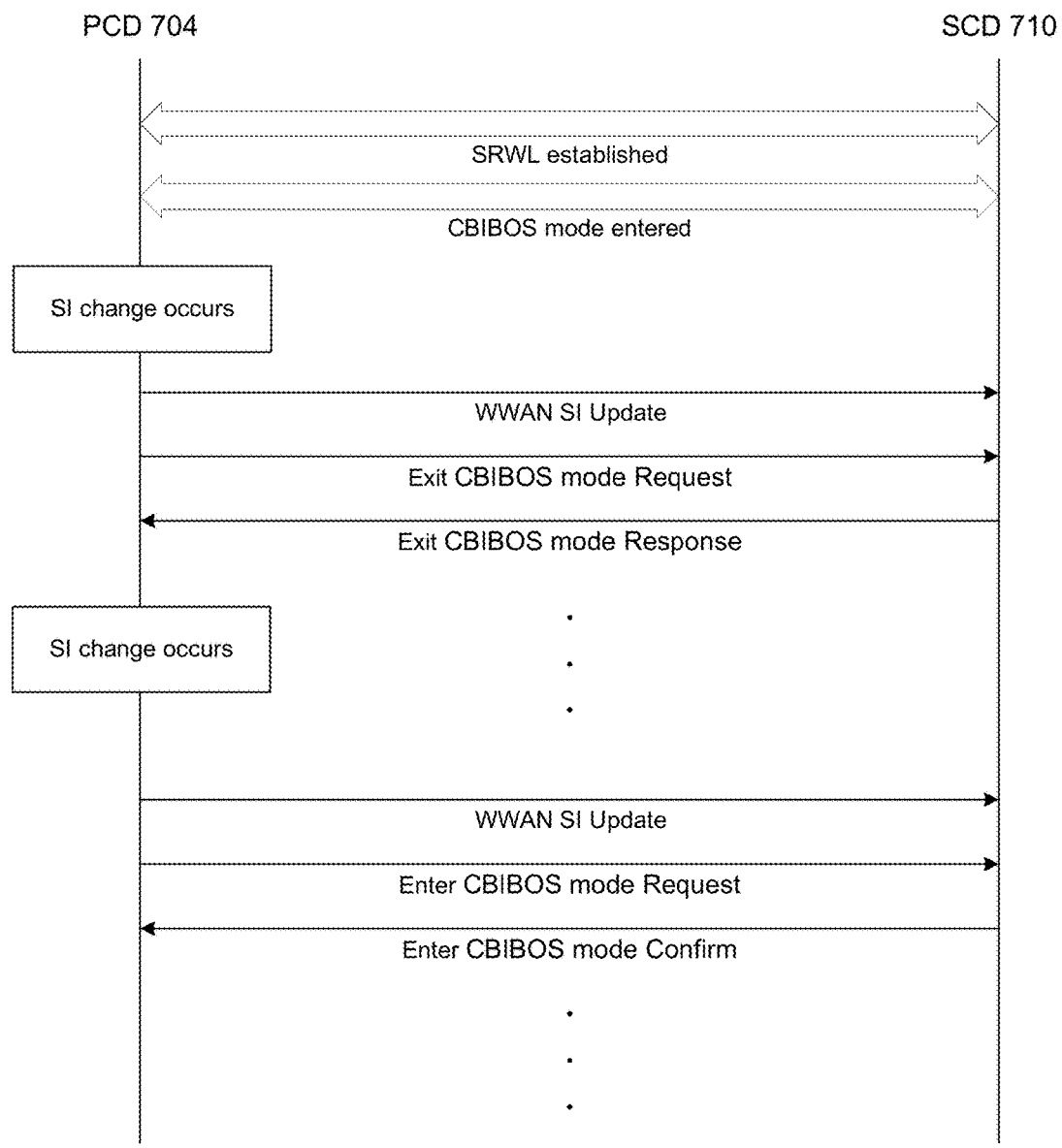
FIG. 17 illustrates an MSC for an example scenario for the handling of Discontinuous Reception (DRX) cycle change by leading to the end of CBIBOS mode followed by DRX cycle change leading to entering to CBIBOS mode according to the aspects of the present disclosure.

The network may update the default DRX cycle or paging cycle as part of SI change and which may change the PO to be monitored for the current serving cell for the PCD. Sometimes a user may change the DRX cycle on the PCD and which may also lead to change in the PO to be monitored for the current serving cell for the PCD. According to an aspect of the present disclosure, when the PCD and the SCDs are in CBIBOS mode and if there is a change in the PO to be monitored for the PCD serving cell the PCD may not able to continue the CBIBOS mode with one or more of the SCDs then the PCD may send "Exit CBIBOS mode Request" to one or more of the SCDs and may exit the CBIBOS mode with those SCDs. An example of MSC for handling this type of scenario is illustrated in FIG. 17 where initially the PCD 704 and the SCD 710 are in CBIBOS mode. At some point the SI of the camped on cell of the SCD 710 may be updated by the network and to ensure that the CBIBOS mode can be continued, the PCD may send the "WWAN SI Update" message to the SCD 710. The PCD 704 may determine that it may not be able to support the CBIBOS mode for the SCD 710 for the updated DRX cycle in the new SI. Therefore, the PCD 704 may send the "Exit CBIBOS mode Request" message to the SCD 710 which may accept the request and send the "Exit CBIBOS mode Response" message to the PCD. At further later point in time, the SI of the camped on cell of the SCD 710 may be updated by the network and the PCD may send the "WWAN Camped on Cell Information Response" message to the PCD to update its serving cell information. The PCD 704 may determine that it may be able to support the CBIBOS mode for the SCD 710 for the updated DRX cycle in the newly updated SI. Therefore, the PCD 704 may send the "Enter CBIBOS mode Request" message to the SCD 710 which may accept the request and send the "Enter CBIBOS mode Response" message to the PCD. From this point forward, the PCD may continue to monitor the PO and the SI for the serving cell of the SCD 710.

Although the PCD monitors the SI messages for the SCDs and receives the SI messages from the cells of the same or different frequencies and RAT types, and sends the SI messages to the SCDs, the PCD may not parse or interpret the SI messages that are received for the SCDs. As part of the SI update, the default DRX cycle or paging cycle may change for the cells of the same or different frequencies and/or RAT types that are monitored for the SCDs. According to an aspect of the present disclosure, if a SCD detects a change in the default DRX cycle or paging cycle which may change the default PO to be monitored in its current serving cell then the SCD may communicate the changed default DRX cycle or paging cycle to the PCD. According to an aspect of the present disclosure, the PCD may parse or interpret a selective list of SI messages that are received from the serving cell of a SCD, to obtain the default DRX cycle or paging cycle change in any of the SCD serving cell and the PCD may adopt the PO monitoring for the SCD serving cell as per the updated PO. According to an aspect of the present disclosure, when there is a change in the PO for the SCD's serving cell, the PCD may not be able to continue to monitor the new PO because of overlap in PO and in such a case the PCD may send "Exit CBIBOS mode Request" to one or more of the SCDs and may exit the CBIBOS mode with those SCDs.

Although the term SRWL is used herein to describe the various aspects of the present disclosure, the disclosure may be applicable to any client device that may be using a WWAN and the short range connectivity link may not necessarily be wireless and the client device may not necessarily be mobile. For example, the PCD and the SCDs may be communicating over a wired connection such as Universal Serial Bus (USB), Universal Asynchronous Receiver/Transmitter (UART), Inter-Integrated Circuit (I2C), General Purpose Input/Output (GPIO), Ethernet cables, etc. In one example of connectivity, the SCDs may be connected to the PCD over Ethernet for internet connection but may continue to use the WWAN for other services. In this case the PCD may use its own WWAN modem to decode the SI of the cell on which the SCD is camped and provide any updated SIs to the SCDs over the Ethernet. In another example, an SCD may be connected to a Personal Computer (PC) that has a built-in WWAN modem. The SCD may be connected to the PC over a USB cable for charging and/or transferring music, images, videos, etc. between the PC and the SCD. In this case, the PC may be in the equivalent role of a PCD. The PC may use its WWAN modem to decode the SI of the cell on which the SCD is camped and provide any updated SIs to the SCDs over the USB cable.

The invention claimed is:

1. A method of collaborative communication of broadcast information in a communication network in which a Short Range Wireless Links (SRWL) is established between a first client device and a plurality of second client devices, the method comprising:
controlling, by a processing device, at the first client device,
receiving over the SRWL a broadcast Primary Client Device (PCD) Request message transmitted from each of a third client device and fourth client device of the second client devices;
transmitting over the SRWL a PCD Accept message to each of the third and fourth client devices; and
receiving over the SRWL broadcast information of a Wireless Wide Area Network (WWAN) through the third client device and the fourth client device.

2. The method of claim 1, further comprising:
controlling, by a processing device, at the first client device as a secondary client device (SCD) of the third and fourth client devices, receiving over the SRWL a first subset of system information blocks (SIBs) from the third client device as a first PCD of the first client device and a second subset of SIBs from the fourth client device as a second PCD of the first client device.

3. The method of claim 1, further comprising:
controlling, by the processing device, at the first client device,
when the first client device is moved away from one of the third client device and the fourth client device respectively, continuing to receive over the SRWL a remaining broadcast information of the WWAN from the other of the third client device and the fourth client device.

4. The method of claim 1, further comprising:
controlling, by the processing device, at the first client device as a secondary client device (SCD) of the third and fourth client devices each of which is a PCD of the first client device,
when the first client device receives over the SRWL a PCD Revoke broadcast message from one of the third client device and the fourth client device, determining whether at least one PCD for the first client device is remaining on the SRWL,
when a determination is at least one PCD is remaining, continuing to receive over the SRWL the broadcast information form the WWAN from the at least one PCD remaining on the SRWL,
when a determination is not one PCD is remaining on the SRWL, receiving over the SRWL a PCD Request message from a fifth client device of the second client devices, in which the PCT Request message from the fifth client device is based on a determination at the fifth client device which was previously a SCD for the first client device on the SRWL to become a PCD for the first client device on the SRWL and in which the fifth client device resumes receiving broadcast information directly from the WWAN.

5. A method of collaborative communication of broadcast information in a communication network in which a Short Range Wireless Links (SRWL) is established between a first client device and a plurality of second client devices, the method comprising:
controlling, by a processing device, at the first client device,
receiving broadcast Primary Client Device (PCD) Request messages transmitted over the SRWL respectively from a plurality of third client devices of the second client devices and including received signal metrics;
comparing the received signal metrics from the plurality of third client devices and selecting as a preferred PCD a selected client device of the third client devices determined to have a best received signal metric, such that the first client device is a secondary client device (SCD) of the selected client device; and
transmitting over the SRWL a PCD Accept message to the selected client device.

6. The method of claim 5,
wherein the received signal metric includes at least one of a Received Signal Strength Indicator (RSSI), Reference Signal Received Power (RSRP), Reference Signal Received Quality (RSRP) or Signal to Interference Noise Ratio (SINR).

7. The method of claim 5, further comprising:
controlling, by a processing device, at the first client device,
determining, as the selected client device,
a fourth client device of the third client devices which is camped on to a same cell on which the first client device is camped, or
a fifth client device of the third client devices which is not camped on to the same cell on which the first client device is camped and includes a cell ID of ae cell on which the first client device is camped in a neighbors cell list included with the PCD Request message from the fifth client device.

8. The method of claim 5, further comprising:
controlling, by the processing device, at the first client device, when at least one of the third client devices is established as at least one PCD for the first client device, communication and exchanging of WWAN capabilities with the at least one PCD over the SRWL.

9. The method of claim 8,
wherein the exchanging of WWAN capabilities with the at least one PCD includes, for a cell on which each of the first client device and the least one PCD is camped, at least one of a current WWAN identity, a Radio Access Technology (RAT) type, a cell identification (CID), target area information (TAI), frequency of channel, or default Discontinuous Reception (DRX) cycle or paging cycle.

10. A method of collaborative communication of broadcast information in a communication network in which a Short Range Wireless Links (SRWL) is established between a first client device and at least one second client device, the method comprising:
controlling, by a processing device, at the first client device,
receiving over the SRWL a broadcast Primary Client Device (PCD) Request message, wherein the PCD Request message is transmitted from at least one third client device of the at least one second client device;
transmitting over the SRWL a PCD Accept message to the at least one third client device;
receiving over the SRWL broadcast information of a Wireless Wide Area Network (WWAN) through the at least one third client device; and
entering into Cellular Broadcast Information Broadcast over the SRWL (CBIBOS) mode with the at least one third client device.

11. The method of claim 10, further comprising:
controlling, by the processing device, at the first client device, when the at least one third client device as the PCD for the first client device which is a secondary client device (SCD) of the at least one third client device and the SCD are currently camped on to a same serving cell of a same Radio Access Technology (RAT) type and a same frequency,
disabling system information (SI) change notification processing and SI channel decode processing disabled at the SCD as long as the SCD is connected with the PCD and entered into the CBIBOS mode; and
periodically receiving the SI from the WWAN directly and checking the SI received from the WWAN whether a most recent SI for the currently camped on serving cell has been received.

12. The method of claim 10, further comprising:
controlling, by the processing device, at the first client device, when the at least one third client device as the PCD for the first client device which is a secondary client device (SCD) of the first client device and the SCD are currently camped on to different cells $C_a$ and $C_b$ of a same Radio Access Technology (RAT) type and a same frequency,
disabling system information (SI) change notification processing and SI channel decode processing as long as the SCD is connected to the PCD and have entered the CBIBOS mode; and
when a cell reselection is determined to occur in the PCD or the SCD, communicating with the PCD over the SRWL to determine whether to continue or exit the CBIBOS mode with the PCD.

13. The method of claim 10,
in which the at least one third client device is the PCD for the first client device which is a secondary client device (SCD) of the at least one third client device, and
the method further comprising controlling, by the processing device, at the first client device, transmitting over the SRWL a WWAN Camped on Cell Information Response message indicating a change-mark of most current system information (SI) decoded at the first client device.

14. The method of claim 10, further comprising:
controlling, by the processing device, at the first client device, when the at least one third client device as the PCD for the first client device which is a secondary client device (SCD) of the at least one third client device and the SCD are currently camped on to cells $C_{f1}$ and $C_{f2}$ respectively of different frequencies having a same Radio Access Technology (RAT) type,
disabling a system information (SI) change notification processing and SI channel decode processing as long as the SCD is connected to the PCD and entered in the CBIBOS mode with the PCD; and
when a cell reselection in the PCD or the SCD is determined, communicating with the PCD over the SRWL to determine whether to continue to be in or exit the CBIBOS mode with PCD.

15. The method of claim 10, further comprising:
controlling, by the processing device, at the first client device, when the at least one third client device as the PCD for the first client device which is a secondary client device (SCD) of the at least one third client device and the SCD are currently camped on to cells $C_{RAT1}$ and $C_{RAT2}$ respectively of different Radio Access Technology (RAT) types,
disabling system information (SI) change notification processing and SI channel decode processing as long as the SCD is connected to the PCD and in the CBIBOS mode; and
when a cell reselection in the PCD or the SCD is determined, communicating with the PCD over SRWL to determine whether to continue to be in or exit the CBIBOS mode with the PCD.

16. The method of claim 10,
in which the at least one third client device is the PCD for the first client device which is a secondary client device (SCD) of the at least one third client device, and
the method further comprising controlling, by the processing device, at the first client device,
when a determination is the first client device is out of range of or disconnected from the PCD, exiting the CPDTOS mode and starting decoding at least one of a Paging Occasion (PO) or system information (SI) according a predetermined standard procedure.

17. The method of claim 10,
in which the at least one third client device is the PCD for the first client device which is a secondary client device (SCD) of the at least one third client device, and
the method further comprising controlling, by the processing device, at the first client device,
when system information (SI) broadcast over the SRWL from the PCD with a timestamp is received at the SCD, validating the timestamp, determining whether to use or discard the received SI and decoding the SI for a given cell of the WWAN directly based on a determination whether a need for the SI decoding arises.

18. The method of claim 17, further comprising:
controlling, by the processing device, at the first client device, when the broadcast SI is received from the PCD with the timestamp, maintaining validity of the received stored SI for the given cell by monitoring a page message for the given cell.

19. The method of claim 10,
in which the at least one third client device is the PCD for the first client device which is a secondary client device (SCD) of the at least one third client device, and
the method further comprising controlling, by the processing device, at the first client device, when the SCD enters the CBIBOS mode, turning off a Radio Frequency (RF) receiver of a cellular modem of the SCD during a system information (SI) change notification time slot and a SI change time slot and entering a power save state.

20. The method of claim 10,
in which the at least one third client device is the PCD for the first client device which is a secondary client device (SCD) of the at least one third client device, and
the method further comprising controlling, by the processing device, at the first client, when a serving cell of the SCD is changed due to at least one of cell selection, cell reselection or cell change, communicating over the SRWL new cell information of the SCD to the PCD.

21. An apparatus for collaborative communication of broadcast information in a communication network in which a Short Range Wireless Links (SRWL) is established between a first client device and a plurality of second client devices, the apparatus comprising:
circuitry configured to control, at the first client device,
receiving over the SRWL a broadcast Primary Client Device (PCD) Request message transmitted from each of a third client device and fourth client device of the second client devices;
transmitting over the SRWL a PCD Accept message to each of the third and fourth client devices; and
receiving over the SRWL broadcast information of a Wireless Wide Area Network (WWAN) through the third client device and the fourth client device.

22. A wireless communication device comprising:
a receiver to receive a wireless communication; and
a processing device configured for collaborative communication of broadcast information in a communication network in which a Short Range Wireless Links (SRWL) is established between the wireless communication device and a plurality of second client devices,
wherein the processing device is configured to control
receiving over the SRWL a broadcast Primary Client Device (PCD) Request message transmitted from each of a third client device and fourth client device of the second client devices;
transmitting over the SRWL a PCD Accept message to each of the third and fourth client devices; and
receiving over the SRWL broadcast information of a Wireless Wide Area Network (WWAN) through the third client device and the fourth client device.

23. An apparatus for collaborative communication of broadcast information in a communication network in which a Short Range Wireless Links (SRWL) is established between a first client device and a plurality of second client devices, the apparatus comprising:
circuitry configured to control, at the first client device,
receiving broadcast Primary Client Device (PCD) Request messages transmitted over the SRWL respectively from a plurality of third client devices of the second client devices and including received signal metrics;
comparing the received signal metrics from the plurality of third client devices and selecting as a preferred PCD a selected client device of the third client devices determined to have a best received signal metric, such that the first client device is a secondary client device (SCD) of the selected client device; and
transmitting over the SRWL a PCD Accept message to the selected client device.

24. A wireless communication device comprising:
a receiver to receive a wireless communication; and
a processing device configured for collaborative communication of broadcast information in a communication network in which a Short Range Wireless Links (SRWL) is established between the wireless communication device and a plurality of second client devices,
wherein the processing device is configured to control,
receiving broadcast Primary Client Device (PCD) Request messages transmitted over the SRWL respectively from a plurality of third client devices of the second client devices and including received signal metrics;
comparing the received signal metrics from the plurality of third client devices and selecting as a preferred PCD a selected client device of the third client devices determined to have a best received signal metric, such that the wireless communication device is a secondary client device (SCD) of the selected client device; and
transmitting over the SRWL a PCD Accept message to the selected client device.

25. An apparatus for collaborative communication of broadcast information in a communication network in which a Short Range Wireless Links (SRWL) is established between a first client device and at least one second client device, the apparatus comprising:
circuitry configured to control, at the first client device,
receiving over the SRWL a broadcast Primary Client Device (PCD) Request message, wherein the PCD Request message is transmitted from at least one third client device of the at least one second client device;
transmitting over the SRWL a PCD Accept message to the at least one third client device;
receiving over the SRWL broadcast information of a Wireless Wide Area Network (WWAN) through the at least one third client device; and
entering into Cellular Broadcast Information Broadcast over the SRWL (CBIBOS) mode with the at least one third client device.

26. A wireless communication device comprising:
a receiver to receive a wireless communication; and
a processing device configured for collaborative communication of broadcast information in a communication network in which a Short Range Wireless Links (SRWL) is established between the wireless communication device and at least one second client device,
wherein the processing device is configured to control,
receiving over the SRWL a broadcast Primary Client Device (PCD) Request message, wherein the PCD Request message is transmitted from at least one third client device of the at least one second client device;
transmitting over the SRWL a PCD Accept message to the at least one third client device;

receiving over the SRWL broadcast information of a Wireless Wide Area Network (WWAN) through the at least one third client device; and entering into Cellular Broadcast Information Broadcast over the SRWL (CBIBOS) mode with the at least one third client device.

\* \* \* \* \*